US011478882B2

(12) United States Patent
Lee et al.

(10) Patent No.: US 11,478,882 B2
(45) Date of Patent: Oct. 25, 2022

(54) VEHICLE BODY ASSEMBLY SYSTEM

(71) Applicants:Hyundai Motor Company, Seoul (KR); Kia Motors Corporation, Seoul (KR)

(72) Inventors: Hyun Gu Lee, Ulsan (KR); Yoon Jang, Incheon (KR); Chang Ho Jung, Ulsan (KR); Ki Haing Lee, Ulsan (KR); Chi Hong Hwang, Busan (KR); Deug Young So, Gyeonggi-do (KR); Young Do Kim, Ulsan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 213 days.

(21) Appl. No.: 16/664,295

(22) Filed: Oct. 25, 2019

(65) Prior Publication Data
US 2020/0055149 A1 Feb. 20, 2020

Related U.S. Application Data

(62) Division of application No. 15/378,411, filed on Dec. 14, 2016, now abandoned.

(30) Foreign Application Priority Data

Aug. 10, 2016 (KR) .......................... 10-2016-0101689

(51) Int. Cl.
*B62D 65/02* (2006.01)
*B62D 65/00* (2006.01)
(Continued)

(52) U.S. Cl.
CPC .......... *B23K 31/02* (2013.01); *B23K 37/0452* (2013.01); *B62D 65/00* (2013.01);
(Continued)

(58) Field of Classification Search
CPC .... B23K 31/02; B23K 37/0452; B62D 65/02; B62D 65/00; B62D 65/022; B62D 65/026;
(Continued)

(56) References Cited

U.S. PATENT DOCUMENTS 5,400,944 A * 3/1995 Zimmer ................. B62D 65/02
228/49.1
8,042,249 B2 10/2011 Kilibarda
(Continued)

FOREIGN PATENT DOCUMENTS

CN 1136794 A 11/1996
CN 2797159 Y 7/2006
(Continued)

*Primary Examiner* — Lee A Holly
(74) *Attorney, Agent, or Firm* — Fox Rothschild LLP

(57) ABSTRACT

A vehicle body assembly system defines a preset pre-buck section and a preset main-buck section along a conveying route of a floor assembly, and may include: i) pre-buck units which are installed at both sides of the conveying route in the pre-buck section, respectively, restrict lower portions of side assemblies, which vary in accordance with a type of vehicle, with respect to both sides of the floor assembly, and preassemble the lower portions of the side assemblies to the floor assembly by a first welding robot; and ii) main-buck units which are installed at both sides of the conveying route in the main-buck section, respectively, restrict upper portions of the side assemblies preassembled by the pre-buck unit, and post-assemble vehicle body components to the upper portions of the side assemblies by a second welding robot.

24 Claims, 16 Drawing Sheets

(51) Int. Cl.
*B23K 31/02* (2006.01)
*B23K 37/04* (2006.01)

(52) U.S. Cl.
CPC .......... *B62D 65/02* (2013.01); *B60Y 2304/03* (2013.01); *B60Y 2304/05* (2013.01); *B60Y 2304/07* (2013.01); *B60Y 2410/124* (2013.01)

(58) Field of Classification Search
CPC ...... B62D 65/06; B62D 65/12; B62D 65/024; B62D 65/18; B60Y 2304/03; B60Y 2304/05; B60Y 2304/07; B60Y 2410/124
See application file for complete search history.

(56) References Cited

U.S. PATENT DOCUMENTS

| | | |
|---|---|---|
| 2008/0084013 A1 | 4/2008 | Kilibarda |
| 2009/0285666 A1 | 11/2009 | Kilibarda |
| 2015/0001279 A1 | 1/2015 | Yao et al. |

FOREIGN PATENT DOCUMENTS

| | | |
|---|---|---|
| CN | 101772402 A | 7/2010 |
| CN | 101959656 A | 1/2011 |
| CN | 101973323 A | 2/2011 |
| CN | 102951204 A | 3/2013 |
| DE | 4406615 A1 | 9/1995 |
| JP | 2015-027838 A | 2/2015 |
| KR | 10-0887970 B1 | 3/2009 |
| KR | 10-0897267 B1 | 5/2009 |
| KR | 10-1305173 B1 | 9/2013 |
| KR | 10-1326816 B1 | 11/2013 |

\* cited by examiner

VEHICLE BODY ASSEMBLY SYSTEM

CROSS-REFERENCE TO RELATED APPLICATION

This application is a divisional application of U.S. application Ser. No. 15/378,411, filed Dec. 14, 2016, which claims under 35 U.S.C. § 119(a) the benefit of Korean Patent Application No. 10-2016-0101689 filed in the Korean Intellectual Property Office on Aug. 10, 2016, the entire contents of which are incorporated herein by reference.

BACKGROUND

(a) Technical Field

The present disclosure relates to a vehicle body assembly system, and more particularly, to a vehicle body assembly system configured to assemble vehicle bodies for various types of vehicles during a main-buck process in a vehicle body assembly line.

(b) Description of the Related Art

In general, a vehicle body is manufactured in the form of a white body (i.e., body in white, or "BIW") by a process of assembling various types of product panels produced during a vehicle body sub-process.

The vehicle body includes a floor panel which supports a drive unit such as an engine and axles, and seats at a lower portion of a framework, two side panels which define left and right lateral surfaces of the framework, a roof panel which defines an upper surface of the framework, and other components such as a plurality of cowl panels, a roof rail, a package tray, and a back panel. An operation of assembling the vehicle body components is carried out in a process called a main-buck process (also referred to as a vehicle body build-up process in the art).

In the main-buck process, the back panel is joined to the floor panel, and then the side panels, the cowl panels, the roof rail, the package tray, the roof panel, and the like are assembled by welding, by a vehicle body assembly system.

For example, the vehicle body assembly system restricts the side panel by using a side hanger and a side gate, sets the side panel on the floor panel, sets the cowl panel, the roof rail, the package tray, and the like on the side panel, and then welds the jointed portions of these components by using a welding robot.

A vehicle body assembly system in the related art is provided with a rotary indexer (also typically referred to as a "four-station rotating body" in the art) which has side gates for each vehicle type which are installed at four stations, respectively. The four-station rotary indexer may exactly position side panels, which are matched with the vehicle type, at both sides of the floor panel by being rotated in a state in which the respective side gates restrict the side panels for each vehicle type.

Therefore, in the related art, upper end portions of the side panels, the components (e.g., the cowl panels, the roof rail, and the package tray) associated with the upper end portions of the side panels, lower end portions of the side panels, and the floor panel may be welded by the welding robot in a state in which the components associated with the upper end portions of the side panels are exactly positioned at the upper end portions of the side panels restricted by the side gates of the four-station rotary indexer.

However, because in the related art, the entire framework of the vehicle body is restricted at one time by the side gates for each vehicle type of the four-station rotary indexer, the overall weight and size of the vehicle body assembly system is inevitably increased.

Further, because in the related art, the side gates for each vehicle type are installed at the respective stations of the four-station rotary indexer, it is impossible to assemble vehicle bodies for five or more types of vehicles, and the existing facility, which has a heavy weight and a large size, needs to be additionally installed in order to assemble vehicle bodies for five or more types of vehicles.

The above information disclosed in this Background section is only for enhancement of understanding the background of the disclosure and therefore it may contain information that does not form the prior art that is already known in this country to a person of ordinary skill in the art.

SUMMARY

The present disclosure provides a vehicle body assembly system capable of assembling vehicles bodies for at least five or more types of vehicles by dividing a vehicle body assembly process into two processes, and achieving a reduction in weight of the entire facility, unlike a case in which a framework of a vehicle body is formed by a single process.

An exemplary embodiment of the present disclosure provides a vehicle body assembly system which defines a preset pre-buck section and a preset main-buck section along a conveying route of a floor assembly, the vehicle body assembly system including: i) pre-buck units which are installed at both sides of the conveying route in the pre-buck section, respectively, restrict lower portions of side assemblies, which vary in accordance with a type of vehicle, with respect to both sides of the floor assembly, and preassemble the lower portions of the side assemblies to the floor assembly by a first welding robot; and ii) main-buck units which are installed at both sides of the conveying route in the main-buck section, respectively, restrict upper portions of the side assemblies preassembled by the pre-buck unit, and post-assemble vehicle body components to the upper portions of the side assemblies by a second welding robot.

In addition, in the vehicle body assembly system according to the exemplary embodiment of the present disclosure, the main-buck unit may include a loading unit (e.g., a CRP loading unit, referring to a cowl, a roof rail, and a package tray) which restricts the cowl, the roof rail, and the package tray, which are the vehicle body components, and positions the vehicle body components on the upper portions of the side assemblies.

In addition, in the vehicle body assembly system according to the exemplary embodiment of the present disclosure, the pre-buck unit may restrict a vehicle body conveying direction and the height direction of the side assembly.

In addition, in the vehicle body assembly system according to the exemplary embodiment of the present disclosure, the main-buck unit may restrict a vehicle width direction of the side assembly.

In addition, in the vehicle body assembly system according to the exemplary embodiment of the present disclosure, the pre-buck unit may include: a side hanger which is detachably provided on a handling robot and restricts the lower portion of the side assembly; and a guide post which is coupled with the side hanger by the handling robot, and exactly positions the side hanger at each of both sides of the floor assembly.

In addition, in the vehicle body assembly system according to the exemplary embodiment of the present disclosure, the pre-buck unit may include a robot hanger which unloads the side assembly conveyed to the pre-buck section by a conveying hanger and loads the side assembly to the side hanger.

In addition, in the vehicle body assembly system according to the exemplary embodiment of the present disclosure, the robot hanger may include an alignment jig for aligning the side assembly.

In addition, in the vehicle body assembly system according to the exemplary embodiment of the present disclosure, the main-buck unit may include: a plurality of side jigs which restricts the upper portion of the side assembly that varies in accordance with the type of vehicle; and a four-station rotary indexer which fixes the side jig.

In addition, in the vehicle body assembly system according to the exemplary embodiment of the present disclosure, the main-buck unit may attach and detach the side jig to and from the rotary indexer by a handling robot. Another exemplary embodiment of the present disclosure provides a vehicle body assembly system which defines a pre-buck section and a main-buck section along a conveying route of a floor assembly, the vehicle body assembly system including: i) a side hanger which is mounted on a handling robot in the pre-buck section and restricts a lower portion of a side assembly that varies in accordance with a type of vehicle; ii) a guide post which is coupled with the side hanger, which restricts the side assembly in the pre-buck section, and installed to be reciprocally movable in a vehicle width direction at each of both sides of the conveying route; iii) at least one first welding robot which is installed in the pre-buck section and welds the lower portion of the side assembly and the floor assembly; iv) a plurality of side jigs which is provided to be mountable on a handling robot in the main-buck section and restricts an upper portion of the side assembly that varies in accordance with the type of vehicle; v) a rotary indexer which is coupled with the side jigs in the main-buck section, provided to be rotatable at a preset angle, and installed to be reciprocally movable in the vehicle width direction at each of both sides of the conveying route; and vi) at least one second welding robot which is installed in the main-buck section and welds the upper portion of the side assembly and vehicle body components.

In addition, the vehicle body assembly system according to the exemplary embodiment of the present disclosure may further include a robot hanger which unloads the side assembly conveyed to the pre-buck section by a conveying hanger and loads the side assembly to the side hanger.

In addition, in the vehicle body assembly system according to the exemplary embodiment of the present disclosure, the robot hanger may include an alignment jig for aligning the side assembly.

In addition, the vehicle body assembly system according to the exemplary embodiment of the present disclosure may further include a loading unit (e.g., a CRP loading portion, referring to a cowl, a roof rail, and a package tray) which is provided above the conveying route so as to be movable along the conveying route, and installed to be movable upward and downward in the main-buck section.

In addition, in the vehicle body assembly system according to the exemplary embodiment of the present disclosure, the loading unit may restrict the cowl, the roof rail, and the package tray, which are the vehicle body components, and may exactly position the vehicle body components on the upper portion of the side assembly.

In addition, in the vehicle body assembly system according to the exemplary embodiment of the present disclosure, the guide post may be reciprocally movably installed on a pre-buck frame, and the rotary indexer may be reciprocally movably installed on a main-buck frame.

In addition, in the vehicle body assembly system according to the exemplary embodiment of the present disclosure, a storage unit for storing the plurality of side jigs may be provided in the main-buck section.

In addition, in the vehicle body assembly system according to the exemplary embodiment of the present disclosure, the side hanger may include: a hanger frame which is mounted at a tip of an arm of the handling robot in the pre-buck section; at least one reference pin which is installed on the hanger frame and fitted with a reference hole of the side assembly; a plurality of first clampers which is installed on the hanger frame, clamps the lower portion of the side assembly, and restricts a vehicle body conveying direction and a height direction of the side assembly; and a plurality of first coupling pins which is installed on the hanger frame and coupled to the guide post.

In addition, in the vehicle body assembly system according to the exemplary embodiment of the present disclosure, the first clampers, which correspond to front, center, and rear pillars of the side assembly among the plurality of first clampers, may be installed to be reciprocally movable in the vehicle body conveying direction by a drive unit.

In addition, in the vehicle body assembly system according to the exemplary embodiment of the present disclosure, a plurality of mounting seats may be formed on the hanger frame in order to additionally mount the first clampers.

In addition, in the vehicle body assembly system according to the exemplary embodiment of the present disclosure, the first coupling pin may have a first ball coupling groove that is formed in a circumferential direction of the first coupling pin and has a rounded shape.

In addition, in the vehicle body assembly system according to the exemplary embodiment of the present disclosure, the guide post may include: a first movable member which is installed on the pre-buck frame at each of both sides of the conveying route so as to be reciprocally movable in the vehicle width direction by the drive unit; a pair of post frames which is installed on the first movable member so as to be spaced apart from each other; and a plurality of hanger coupling units which is installed on the post frame and is pin-coupled to the side hanger.

In addition, in the vehicle body assembly system according to the exemplary embodiment of the present disclosure, the hanger coupling unit may include: a first pin housing with which the first coupling pin provided on the side hanger is fitted; and a first ball clamp which is installed in the first pin housing and clamps the first coupling pin by a plurality of balls.

In addition, in the vehicle body assembly system according to the exemplary embodiment of the present disclosure, the first ball clamp may include a pair of first race members which is provided such that the balls roll, and installed to be movable from the outside to the center of the first coupling pin in the circumferential direction by the drive unit.

In addition, in the vehicle body assembly system according to the exemplary embodiment of the present disclosure, the first coupling pin may have a first ball coupling groove that is formed in the circumferential direction of the first coupling pin and has a rounded shape, and the balls may be coupled to the first ball coupling groove by the first race members.

In addition, in the vehicle body assembly system according to the exemplary embodiment of the present disclosure, the handling robot may be moved by being synchronized with the first movable member in a state in which the side hanger is coupled to the hanger coupling unit by the handling robot.

In addition, in the vehicle body assembly system according to the exemplary embodiment of the present disclosure, the handling robot may be separated from the side hanger in a state in which the side hanger is coupled to the hanger coupling unit by the handling robot.

In addition, in the vehicle body assembly system according to the exemplary embodiment of the present disclosure, a driving power supply unit for providing driving power to the side hanger may be installed on the post frame.

In addition, in the vehicle body assembly system according to the exemplary embodiment of the present disclosure, a plurality of second clampers, which clamps a lowest end portion of the side assembly separately from the side hanger in a state in which the side hanger is coupled to the hanger coupling unit, may be installed on the first movable member.

In addition, in the vehicle body assembly system according to the exemplary embodiment of the present disclosure, the second clamper may be installed to be reciprocally movable by the drive unit in three-axis directions including the vehicle body conveying direction, the vehicle width direction, and a height direction.

In addition, in the vehicle body assembly system according to the exemplary embodiment of the present disclosure, a first position sensor, which detects a position of the side assembly and controls the drive unit based on a detection signal, may be installed on the second clamper.

In addition, in the vehicle body assembly system according to the exemplary embodiment of the present disclosure, the side jig may include: a jig frame which is mounted at a tip of an arm of the handling robot in the main-buck section; a plurality of third clampers which is installed on the jig frame, clamps the upper portion of the side assembly, and restricts the vehicle width direction of the side assembly; and a plurality of second coupling pins which is installed on the jig frame and coupled to the rotary indexer.

In addition, in the vehicle body assembly system according to the exemplary embodiment of the present disclosure, the second coupling pin may have a second ball coupling groove that is formed in a circumferential direction of the second coupling pin and has a rounded shape.

In addition, in the vehicle body assembly system according to the exemplary embodiment of the present disclosure, the rotary indexer may include: a second movable member which is installed on the main-buck frame at each of both sides of the conveying route so as to be reciprocally movable in the vehicle width direction by a drive unit; a pair of indexer frames which is installed on the second movable member so as to be spaced apart from each other; a rotating body which has four sides at which the side jigs, which vary in accordance with the type of vehicle, are attached and detached, and are installed on the indexer frames so as to be rotatable by the drive unit; a plurality of jig coupling units which is provided at the respective sides of the rotating body and pin-coupled to the side jigs; and a plurality of fourth clampers which is installed at the respective sides of the rotating body and fixes the side jigs to the rotating body.

In addition, in the vehicle body assembly system according to the exemplary embodiment of the present disclosure, the jig coupling unit may include: a second pin housing with which the second coupling pin provided on the side jig is fitted; and a second ball clamp which is installed in the second pin housing and clamps the second coupling pin by a plurality of balls.

In addition, in the vehicle body assembly system according to the exemplary embodiment of the present disclosure, the second ball clamp may include a pair of second race members which is provided such that the balls roll, and installed to be movable from the outside to the center of the second coupling pin in the circumferential direction by the drive unit.

In addition, in the vehicle body assembly system according to the exemplary embodiment of the present disclosure, the second coupling pin may have a second ball coupling groove that is formed in the circumferential direction of the second coupling pin and has a rounded shape, and the balls may be coupled to the second ball coupling groove by the second race members.

In addition, in the vehicle body assembly system according to the exemplary embodiment of the present disclosure, a second position sensor, which detects a position of the side assembly and controls the drive unit of the second movable member based on a detection signal, may be installed on the indexer frame.

In addition, in the vehicle body assembly system according to the exemplary embodiment of the present disclosure, a vehicle type tag may be mounted on the side jig, and tag readers may be mounted at the respective sides of the rotating body.

In the exemplary embodiments of the present disclosure, the lower portions of the side assemblies may be preassembled to the floor assembly by the pre-buck unit in the pre-buck section, and the vehicle body components may be post-assembled to the upper portions of the side assemblies by the main-buck unit in the main-buck section.

Therefore, in the exemplary embodiment of the present disclosure, since the vehicle body assembly process is divided into the two processes unlike the related art in which a framework of a vehicle body is formed by a single process, it is possible to assemble vehicle bodies so as to correspond to various types of vehicles such as at least five types of vehicles, and to apply the vehicle body assembly system to various types of vehicles in common by using the robots.

Therefore, in the exemplary embodiment of the present disclosure, it is possible to flexibly produce various types of vehicles, reduce time required to prepare the facility, achieve a reduction in weight of the entire facility, simplify the entire facility, and reduce initial investment costs and investment costs when the type of vehicle is added.

BRIEF DESCRIPTION OF THE DRAWINGS

The drawings are intended to be used as references for describing the exemplary embodiments of the present disclosure, and the accompanying drawings should not be construed as limiting the technical spirit of the present disclosure.

DETAILED DESCRIPTION OF THE EMBODIMENTS

Figure 1:
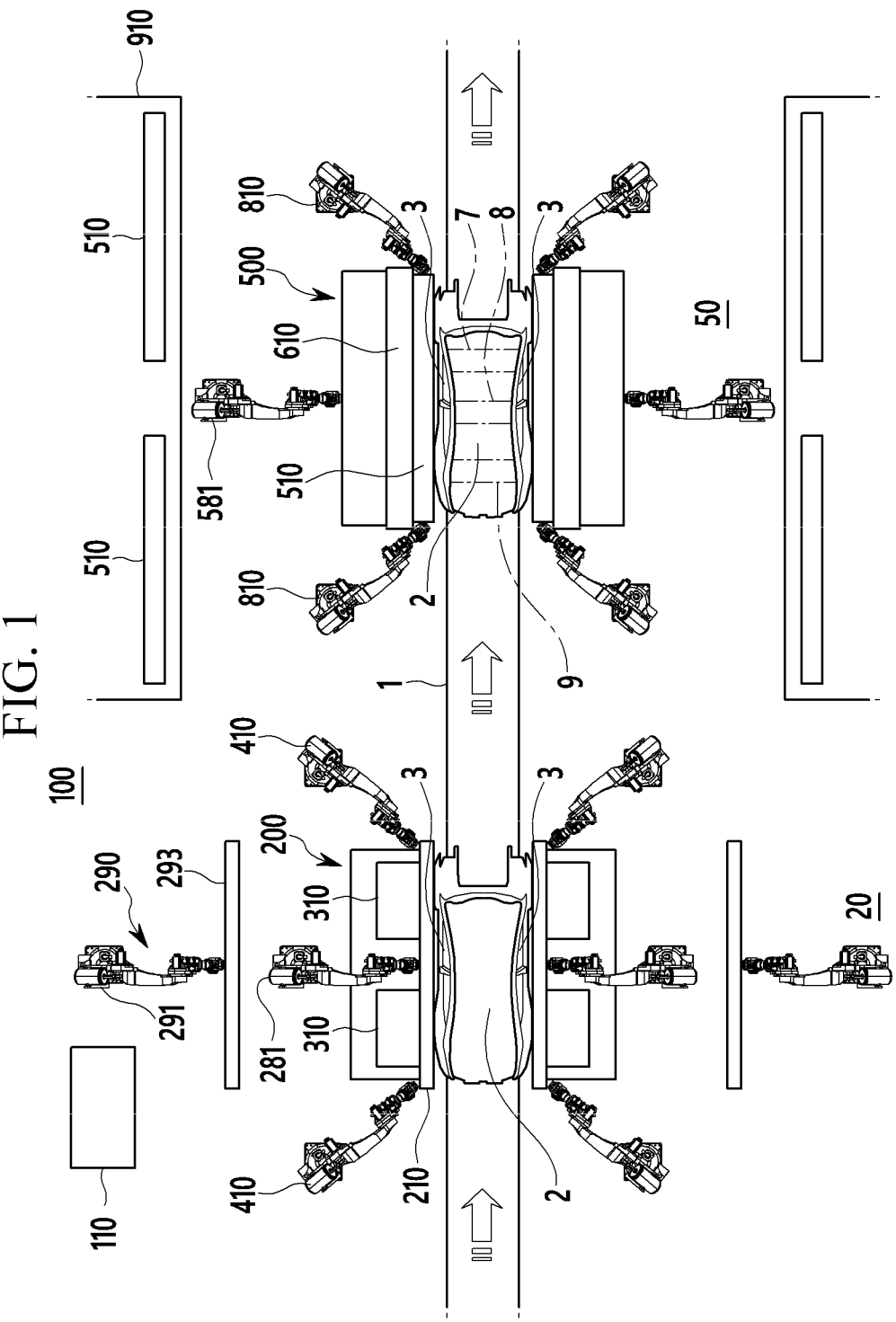
FIGS. 1 and 2 are configuration diagrams schematically illustrating a vehicle body assembly system according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, an exemplary embodiment of the present disclosure will be described in detail with reference to the accompanying drawings so that those skilled in the technical field to which the present disclosure pertains may easily carry out the exemplary embodiment. However, the present disclosure may be implemented in various different ways, and is not limited to the exemplary embodiments described herein.

Figure 2:
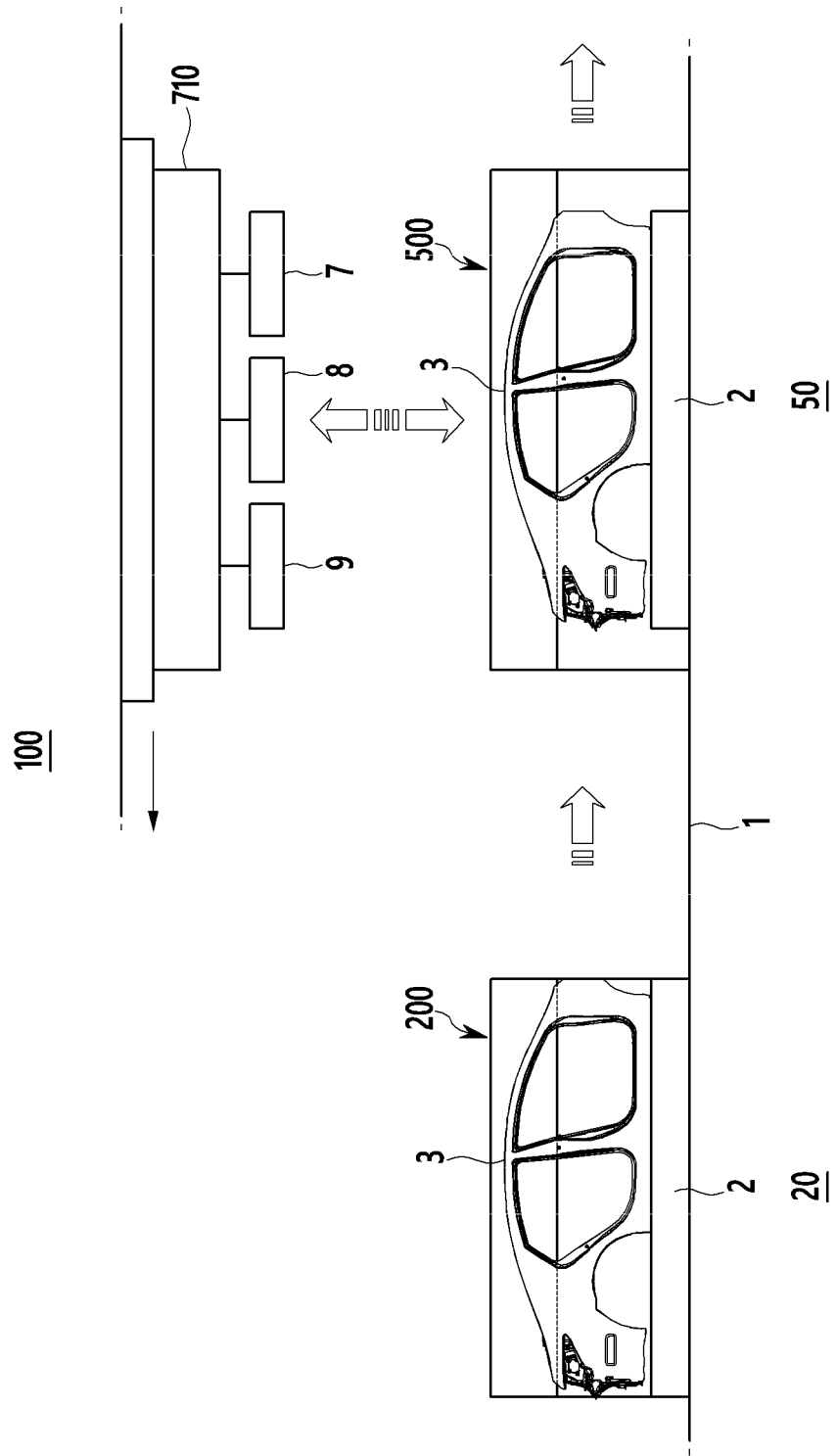

FIGS. 1 and 2 are configuration diagrams schematically illustrating a vehicle body assembly system according to an exemplary embodiment of the present disclosure.

Referring to FIGS. 1 and 2, a vehicle body assembly system 100 according to the exemplary embodiment of the present disclosure may be applied to a vehicle body assembly line in which vehicle body assembly components delivered from a vehicle body sub assembly line are restricted and welded to be assembled as one finished vehicle body.

The vehicle body assembly line includes a main process of assembling a floor assembly which is a base of a vehicle body, a side process of assembling side assemblies which are wall surface components of the vehicle body, and a main-buck process of assembling the side assembly to the floor assembly and assembling a cowl, a roof rail, a package tray, and the like to the side assembly.

Here, the main-buck process refers to a process of fixing a welding fixture by using a large-sized apparatus, and integrally assembling a side body assembly and an under body by swing, rotating, and shifting the welding fixture.

The vehicle body assembly system 100 according to the exemplary embodiment of the present disclosure may be applied to the main-buck process of assembling the floor assembly, the left and right side assemblies, the cowl, the roof rail, the package tray, and the like by using a spot welding facility with robots in the vehicle body assembly line.

Hereinafter, an example in which based on the floor assembly in the main-buck process, the side assemblies are joined to both sides of the floor assembly and then the cowl, the roof rail, the package tray, and the like are assembled to the side assemblies will be described.

In particular, based on a floor assembly 2 which is conveyed along a preset conveying route through a carriage line 1, the vehicle body assembly system 100 according to the exemplary embodiment of the present disclosure may assemble side assemblies 3 to both sides of the floor assembly 2, and may assemble a cowl 7, a roof rail 8, and a package tray 9 to the side assemblies 3.

In the exemplary embodiment of the present disclosure, a direction in which the floor assembly 2 is conveyed is defined as a vehicle body conveying direction, and in the art, the vehicle body conveying direction is defined as a T direction, a vehicle width direction is defined as an L direction, and a height direction of the vehicle body is defined as an H direction. However in the exemplary embodiment of the present disclosure, the L, T, and H directions are defined as the vehicle body conveying direction, the vehicle width direction, and the height direction, respectively.

The vehicle body assembly system 100 according to the exemplary embodiment of the present disclosure has a structure capable of assembling vehicles bodies for at least five or more types of vehicles by dividing a vehicle body assembly process into two processes, and achieving a reduction in weight of the entire facility, unlike a case in which a framework of a vehicle body is formed by a single process.

To this end, the vehicle body assembly system 100 according to the exemplary embodiment of the present disclosure defines a pre-buck section 20 and a main-buck section 50 which are defined along the conveying route of the carriage line 1.

Further, the vehicle body assembly system 100 according to the exemplary embodiment of the present disclosure basically includes a pre-buck unit 200 configured in the pre-buck section 20, and a main-buck unit 500 configured in the main-buck section 50.

In the pre-buck section 20 and the main-buck section 50, the pre-buck unit 200 and the main-buck unit 500 may be installed on a single frame, or may be installed on respective frames separated from each other.

The frame serves to support the constituent elements, and has various types of accessory elements such as brackets, support blocks, plates, housings, covers, and collars. However, because the accessory elements serve to install the respective constituent elements on the frame, the accessory elements will be commonly referred to as the frame in the exemplary embodiment of the present disclosure except for exceptions.

In the exemplary embodiment of the present disclosure, the pre-buck unit 200 serves to restrict a lower portion of the side assembly 3, which varies in accordance with a type of vehicle, with respect to both sides of the floor assembly 2, and to preassemble the lower portion to the floor assembly 2. The pre-buck units 200 are disposed at both sides of the conveying route of the carriage line 1 in the pre-buck section 20, respectively.

Figure 3:
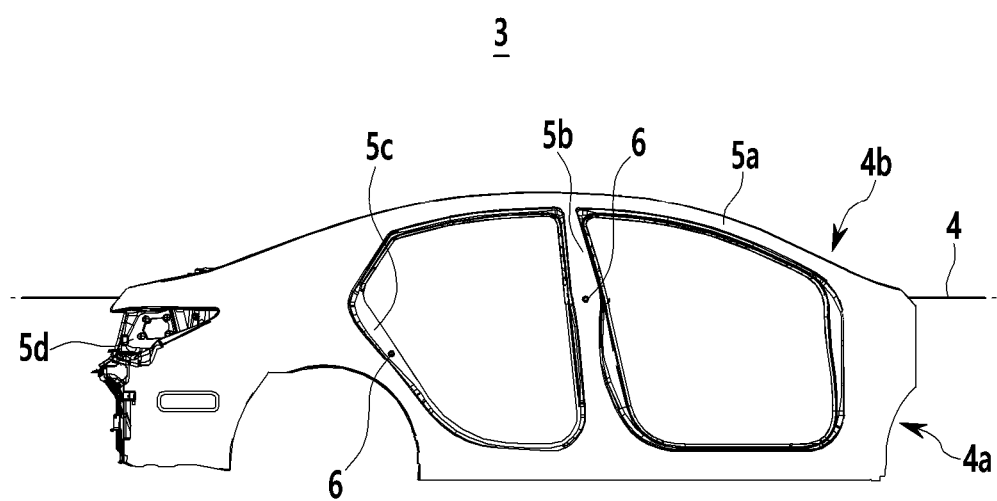
FIG. 3 is a view illustrating a side assembly applied to the vehicle body assembly system according to the exemplary embodiment of the present disclosure.

Meanwhile, as illustrated in FIG. 3, in the exemplary embodiment of the present disclosure, the side assembly 3 may be divided into a lower portion 4a and an upper portion 4b based on a dotted reference line 4. Further, the side assembly 3 further includes a front pillar 5a, a center pillar 5b, a rear pillar 5c, and a rear combination lamp portion 5d. Further, the side assembly 3 has at least one reference hole 6 formed to restrict the side assembly 3 to an exact position.

Figure 4:
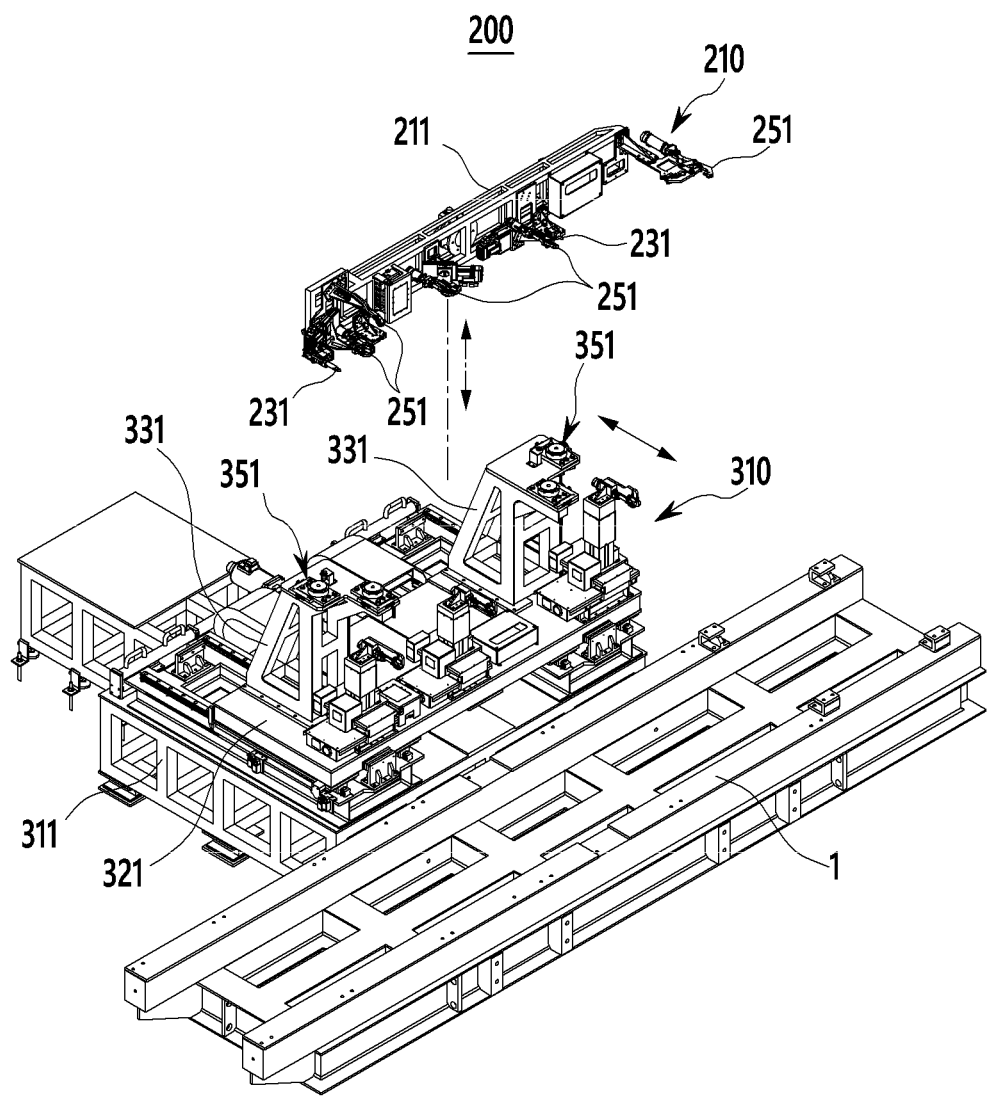
FIG. 4 is a perspective view illustrating a pre-buck unit applied to the vehicle body assembly system according to the exemplary embodiment of the present disclosure.

FIG. 4 is a perspective view illustrating the pre-buck unit applied to the vehicle body assembly system according to the exemplary embodiment of the present disclosure.

Referring to FIGS. 1 and 4, the pre-buck unit 200 according to the exemplary embodiment of the present disclosure includes side hangers 210, guide posts 310, and a plurality of first welding robots 410 which serve to restrict the vehicle body conveying direction and the height direction of the side assemblies 3 and preassemble the lower portions 4a (see FIG. 3) of the side assemblies 3 to the floor assembly 2.

Here, the preassembly refers to a process of assembling the lower portions of the side assemblies 3 to the floor assembly 2 by welding, instead of setting assembly in which a side coupled type side assembly 3 is positioned on the floor assembly 2 of a vehicle body.

In the exemplary embodiment of the present disclosure, the side hanger 210 serves to clamp or grip the lower portion 4a of the side assembly 3 which varies in accordance with the type of vehicle, and to restrict the vehicle body conveying direction and the height direction of the side assembly 3.

The side hanger 210 may be provided as a hanger for common use which may restrict the lower portion 4a of the side assembly 3, which varies in accordance with the type of vehicle, to an exact position in common. The side hanger 210 is mounted on a first handling robot 281 in the pre-buck section 20.

Meanwhile, the side hanger 210 may restrict the lower portion 4a of the side assembly 3 which is aligned to a preset position by a separate alignment mechanism in the pre-buck section 20. To this end, the pre-buck unit 200 according to the exemplary embodiment of the present disclosure includes a robot hanger 290, as illustrated in FIG. 1.

The robot hanger 290 may unload the side assembly 3 conveyed to the pre-buck section 20 through a conveying hanger 110, and may load the side assembly 3 to the side hanger 210 in a robot-to-robot manner in a state in which the side assembly 3 is aligned to the preset position.

The robot hanger 290 includes an alignment jig 293 mounted at a tip of an arm of a hanger robot 291. The alignment jig 293 serves to align the side assembly 3 to a preset position, and may adjust a reference position of the side assembly 3, support an edge portion of the side assembly 3, and clamp the edge portion. Because the alignment jig 293 is configured as an alignment jig device of a known technology, further description thereof will be omitted in the present specification.

Figure 5:
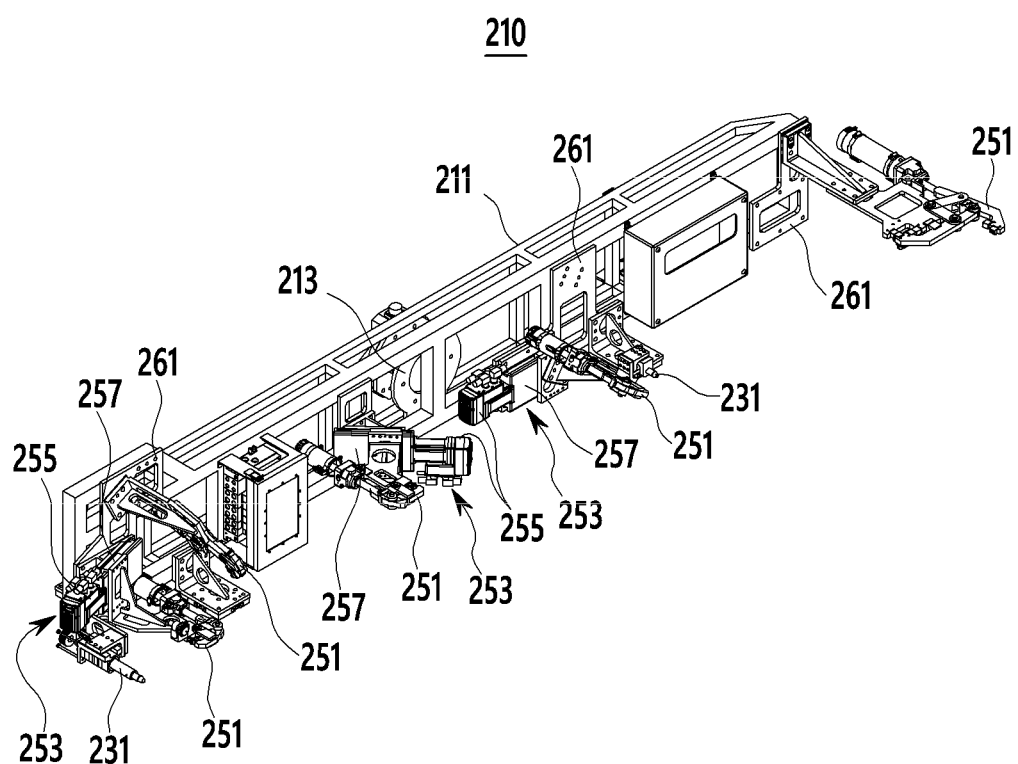
FIGS. 5 and 6 are perspective views illustrating a side hanger applied to the pre-buck unit of the vehicle body assembly system according to the exemplary embodiment of the present disclosure.
Figure 6:
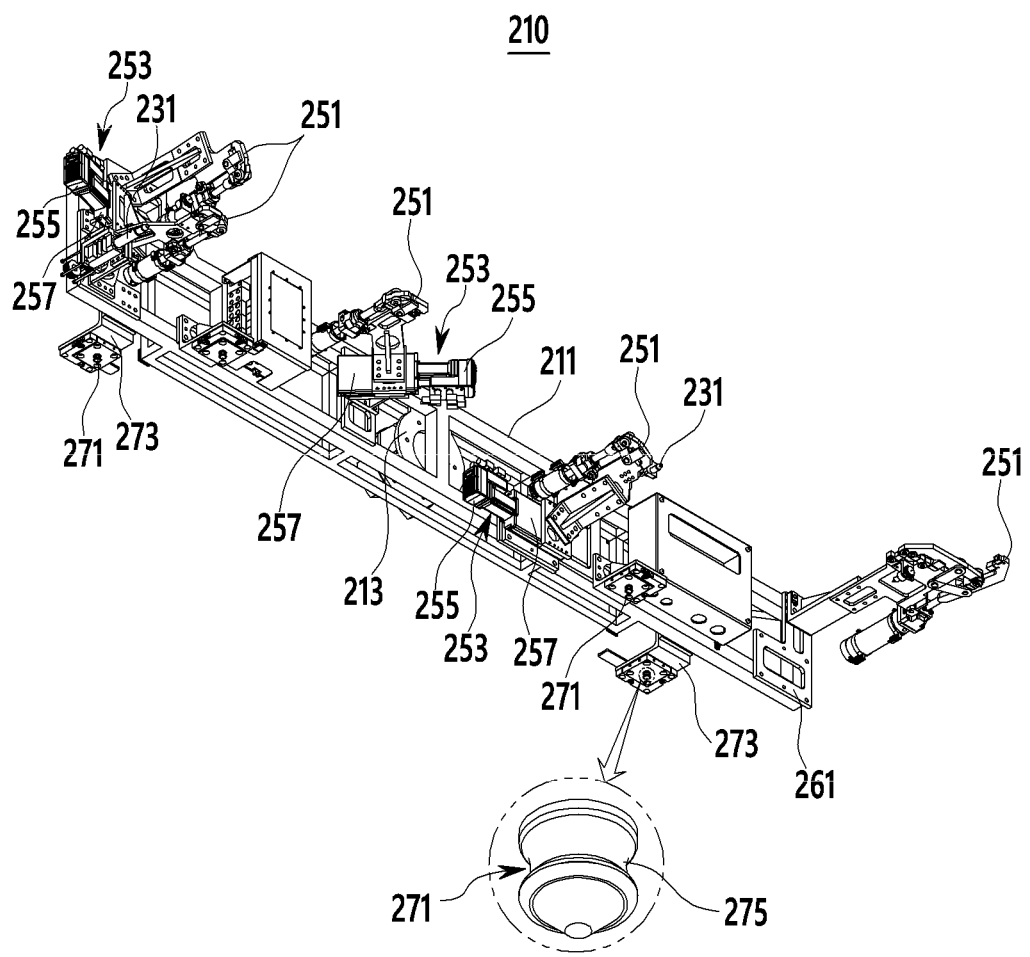

FIGS. 5 and 6 are perspective views illustrating the side hanger applied to the pre-buck unit of the vehicle body assembly system according to the exemplary embodiment of the present disclosure.

Referring to FIGS. 4 to 6, the side hanger 210 according to the exemplary embodiment of the present disclosure basically includes a hanger frame 211, a reference pin 231, first clampers 251, and first coupling pins 271.

The hanger frame 211 is mounted at the tip of the arm of the first handling robot 281 (see FIG. 1) positioned in the pre-buck section 20 (see FIG. 1). The hanger frame 211 may be mounted at or separated from the tip of the arm of the first handling robot 281 by a tool changer 213.

The reference pin 231 serves to adjust the reference position of the side assembly 3, and at least one reference pin 231 is installed on the hanger frame 211. The reference pin 231 is inserted into the reference hole 6 of the side assembly 3 as illustrated in FIG. 3.

The reference pin 231 may be moved forward and rearward at a front side of the hanger frame 211 by a drive mechanism (not shown) and may be inserted into the reference hole 6 of the side assembly 3. Further, the reference pin 231 may be configured to be changeable in position in three-axis directions including the vehicle body conveying direction, the vehicle width direction, and the height direction by the drive mechanism so as to correspond to the reference hole 6 of the side assembly 3 which varies in accordance with the type of vehicle.

The first clamper 251 clamps only the lower portion 4a of the side assembly 3 and restricts the vehicle body conveying direction and the height direction of the side assembly 3, and a plurality of first clampers 251 is installed on the hanger frame 211.

The first clampers 251 are installed at both end portions of the hanger frame 211, respectively, and the plurality of first clampers 251 is installed between both end portions of the hanger frame 211. The first clampers 251, which are provided at both end portions of the hanger frame 211, may clamp a front side and a rear side (the rear combination lamp portion) of the side assembly 3. The first clampers 251 at both end portions of the hanger frame 211 are fixed to both end portions in a fixed manner.

Further, the plurality of first clampers 251 provided between both end portions of the hanger frame 211 may clamp the front pillar 5a, the center pillar 5b, and the rear pillar 5c of the side assembly 3 as illustrated in FIG. 3.

Here, the first clampers 251, which correspond to the front pillar 5a, the center pillar 5b, and the rear pillar 5c of the side assembly 3, are installed to be reciprocally movable in the vehicle body conveying direction by first drive units 253 in a position variable manner.

The first drive units 253 serve to move the first clampers 251 in the vehicle body conveying direction based on positions of pillar portions of the side assembly 3 which vary in accordance with the type of vehicle. For example, the first drive unit 253 may reciprocally move the first clamper 251 in the vehicle body conveying direction by a first guide structure 257 of a known technology which has a lead (or ball) screw and a guide rail or the like that convert rotational force of a first servomotor 255 into rectilinear motion.

In this case, the first clampers 251 may be installed on the hanger frame 211 in a triangular shape based on a center of the side assembly 3 so as to stably grip the lower portion of the side assembly 3.

Further, the hanger frame 211 has a plurality of mounting seats 261 formed to additionally mount the first clampers 251 corresponding to the side assembly 3 which varies in accordance with the type of vehicle.

The aforementioned fixed type and/or position variable type first clamper 251 may be mounted on the mounting seat 261 so as to correspond to the side assembly 3 which varies in accordance with the type of vehicle.

The first coupling pin 271 serves to couple the hanger frame 211, which restricts the lower portion 4a of the side assembly 3 by the first clampers 251, with a guide post 310 to be further described below.

A plurality of first coupling pins 271 is installed on a rear lower portion of the hanger frame 211. The first coupling pins 271 are mounted on the rear lower portion of the hanger frame 211 by first mounting brackets 273. The first coupling pin 271 is disposed on the first mounting bracket 273 so as to protrude downward.

The first coupling pin 271 has a first ball coupling groove 275 which is formed in a circumferential direction of a cylindrical shape and has a rounded shape. The coupling structure between the first coupling pin 271 and the guide post 310 will be described below in more detail.

Figure 7:
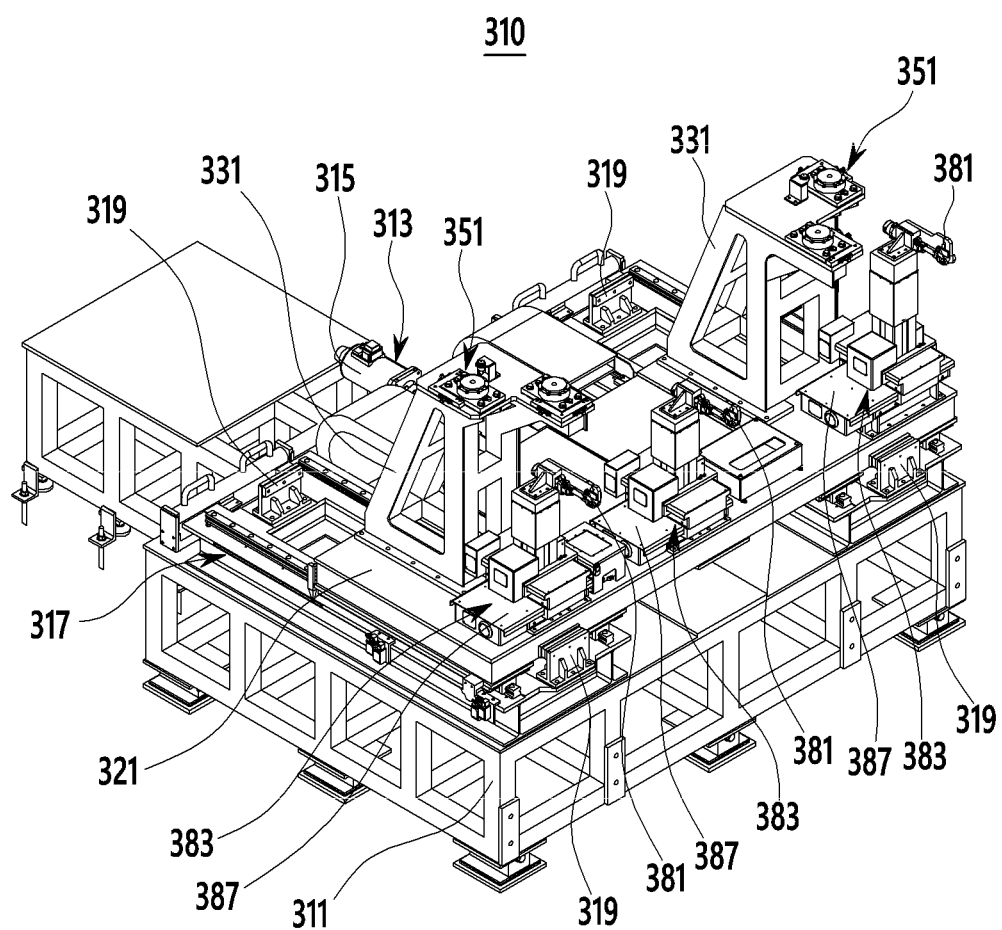
FIG. 7 is a perspective view illustrating a guide post applied to the pre-buck unit of the vehicle body assembly system according to the exemplary embodiment of the present disclosure.

FIG. 7 is a perspective view illustrating the guide post applied to the pre-buck unit of the vehicle body assembly system according to the exemplary embodiment of the present disclosure.

Referring to FIGS. 4 and 7, the guide post 310 according to the exemplary embodiment of the present disclosure is coupled with the side hanger 210 which restricts the side assembly 3 in the pre-buck section 20, and the guide post 310 serves to accurately match the side assemblies 3 with both sides of the floor assembly 2 (see FIG. 1).

Further, the guide post 310 according to the exemplary embodiment of the present disclosure restricts a position variation of the side assembly 3 which may occur when the first handling robot 281 handles the side hanger 210 that restricts the side assembly 3, and the guide post 310 serves to minimize an assembly variation of the side assembly 3 with respect to both sides of the floor assembly 2.

The guide posts 310 are disposed at both sides of the conveying route of the carriage line 1 (see FIG. 1) in the pre-buck section 20, respectively, and the guide posts 310 are coupled with the side hanger 210 by the first handling robot 281 and installed to be reciprocally movable in the vehicle width direction with respect to both sides of the floor assembly 2.

The guide posts 310 may be disposed on pre-buck frames 311 at both sides of the conveying route in the pre-buck section 20 so as to be reciprocally movable in the vehicle width direction. The guide post 310 includes a first movable member 321, a post frame 331, and a hanger coupling unit 351.

The first movable members 321 are installed on the pre-buck frames 311 at both sides of the conveying route so as to be reciprocally movable in the vehicle width direction with respect to both sides of the floor assembly 2 by second drive units 313. For example, the first movable member 321 has a plate shape, and is installed on an upper surface of the pre-buck frame 311 so as to be reciprocally movable in the vehicle width direction by the second drive unit 313.

Here, the second drive unit 313 serves to reciprocally move the first movable member 321 in the vehicle width direction. The second drive unit 313 may reciprocally move the first movable member 321 in the vehicle width direction by a second guide structure 317 of a known technology which has a lead (or ball) screw and a guide rail or the like that convert rotational force of a second servomotor 315 into rectilinear motion.

Because the second drive unit 313 is configured as an electric drive body or moving device of a known technology, further description thereof will be omitted in the present specification.

Meanwhile, first stoppers 319 for exactly positioning the first movable member 321, which is moved in the vehicle width direction by the second drive unit 313, may be provided on the pre-buck frame 311. The first stoppers 319 may be installed at both ends of a guide rail on the pre-buck frame 311, respectively.

The post frame 331 is substantially coupled with the side hanger 210 by the first handling robot 281, and a pair of post frames 331 is installed on the first movable member 321 so as to be spaced apart from each other in the vehicle body conveying direction.

The post frame 331 has a structure in which a plurality of metal bars is connected to one another in the vehicle body conveying direction, the vehicle width direction, and the height direction, and the post frames 331 may be uprightly installed on the first movable member 321 at a predetermined interval in the vehicle body conveying direction. Here, a seating surface on which the side hanger 210 may be seated and coupled is formed on an upper surface of the post frame 331.

As illustrated in FIGS. 5 and 6, the hanger coupling unit 351 serves to couple the hanger frame 211 of the side hanger 210, which restricts the side assembly 3 by the first clamper 251, with the post frame 331.

A plurality of hanger coupling units 351 is installed on the seating surface of the post frame 331. The hanger coupling unit 351 has a structure that may be pin-coupled with the first coupling pin 271 provided on the hanger frame 211 and may clamp the first coupling pin 271.

Figure 8:
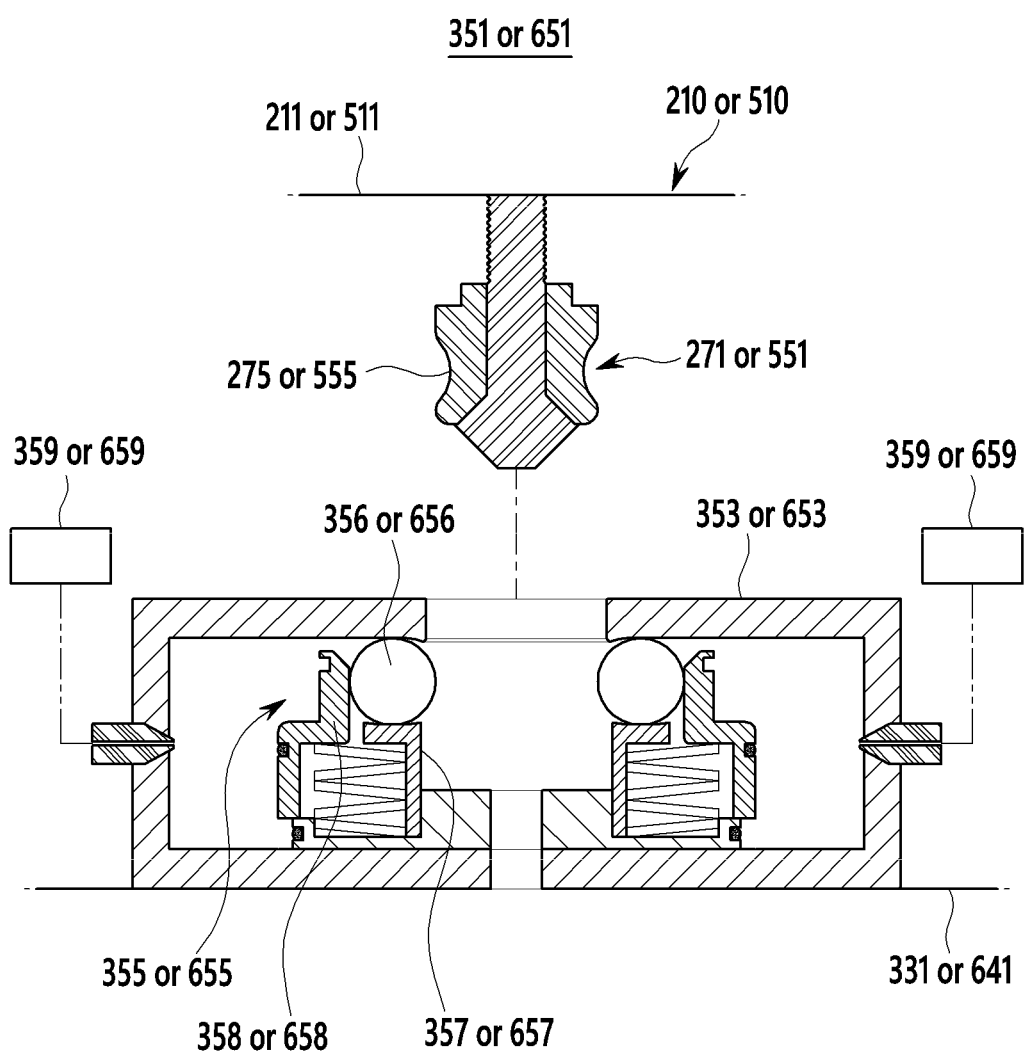
FIGS. 8 and 9 are views schematically illustrating a hanger coupling unit of the guide post applied to the pre-buck unit and a jig coupling unit of a rotary indexer applied to a main-buck unit in the vehicle body assembly system according to the exemplary embodiment of the present disclosure.
Figure 9:
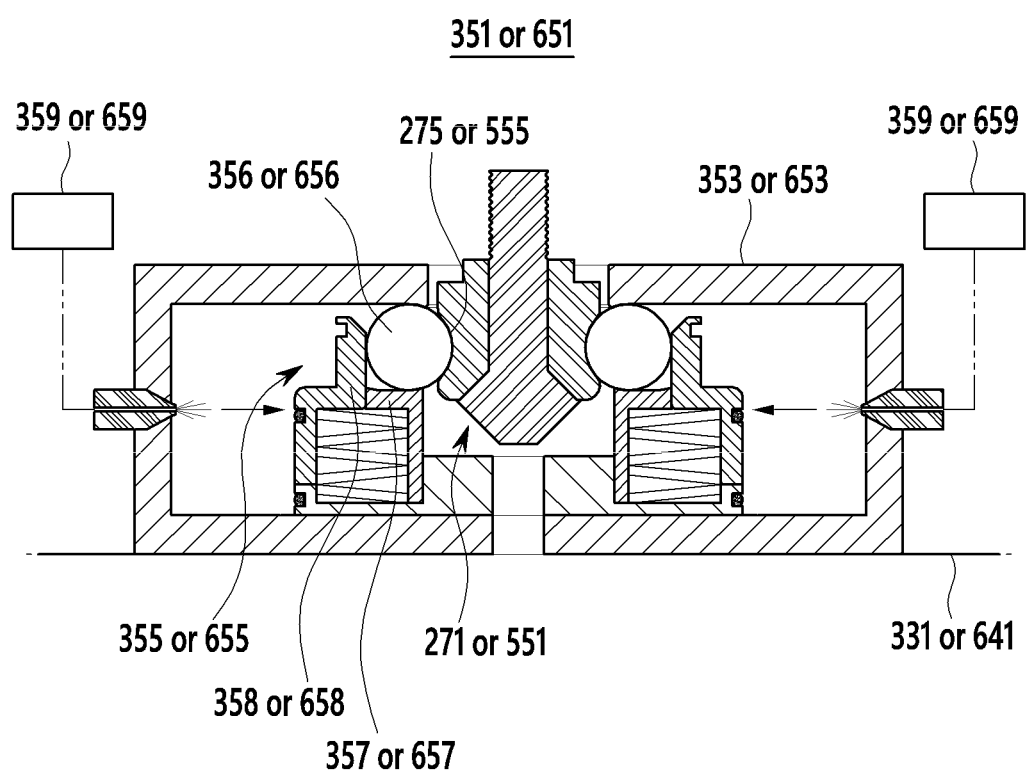

FIGS. 8 and 9 are views schematically illustrating the hanger coupling unit of the guide post applied to the pre-buck unit of the vehicle body assembly system according to the exemplary embodiment of the present disclosure.

Referring to FIGS. 8 and 9, along with FIGS. 5 and 6, the hanger coupling unit 351 according to the exemplary embodiment of the present disclosure includes a first pin housing 353 and a first ball clamp 355.

The first pin housing 353 is fixedly installed on the seating surface of the post frame 331. The first coupling pin 271 of the side hanger 210 is fitted with the first pin housing 353.

The first ball clamp 355 clamps the first coupling pin 271 fitted with the first pin housing 353 by using a plurality of balls 356 and air pressure, and the first ball clamp 355 is installed in the first pin housing 353.

For example, the first ball clamp 355 includes a support race 357 which supports the balls 356 so that the balls 356 may roll, a pair of first race members 358 which is installed to be movable from the outside to the center of the first coupling pin 271 in the circumferential direction, and a third drive unit 359 which provides driving pressure to the first race members 358.

The support race 357 is provided as a circular race that supports the balls 356 so that the balls 356 may roll, and the first race members 358 serve to press the balls 356 by moving from the outside to the center of the first coupling pin 271 in the circumferential direction.

Further, the third drive unit 359 provides air pressure to the first race members 358, and the third drive unit 359 is provided as an air supply source that moves the first race members 358 from the outside to the center of the first coupling pin 271 in the circumferential direction in order to press the balls 356.

When the first coupling pin 271 is not coupled with the first pin housing 353 as illustrated in FIG. 8, the third drive unit 359 of the first ball clamp 355 does not provide air pressure to the first race members 358, and in this case, the balls 356 are held by the support race 357 in a state in which the balls 356 may freely roll.

In addition, when the first coupling pin 271 is coupled to the first pin housing 353 as illustrated in FIG. 9, the third drive unit 359 of the first ball clamp 355 provides air pressure to the first race members 358, and the first race members 358 are moved by the air pressure from the outside to the center of the first coupling pin 271 in the circumferential direction, thereby pressing the balls 356 on the support race 357.

Therefore, the balls 356 may be coupled to the first ball coupling groove 275 of the first coupling pin 271 by the first race members 358, thereby securely fixing the first coupling pin 271 to the first pin housing 353.

Therefore, in the exemplary embodiment of the present disclosure, the ball-clamping type hanger coupling unit 351 clamps the first coupling pin 271 of the side hanger 210, thereby coupling the side hanger 210 to the post frame 331.

In the drawings, the hanger coupling units 351 are illustrated as being provided at four positions on the post frames 331, but the number of hanger coupling units 351 is not necessarily limited thereto, and the hanger coupling units 351 may be provided at three positions.

Further, the hanger coupling units 351 may be installed in a triangular shape on the post frame 331 so that the side hanger 210 may be stably coupled to the post frame 331.

Meanwhile, in the exemplary embodiment of the present disclosure, the side assemblies 3 may be moved to both sides of the floor assembly 2 by the first movable members 321 in a state in which the side hangers 210, which restrict the side assemblies 3, are coupled to the hanger coupling units 351 of the post frames 331 by the first handling robots 281.

During this process, the first handling robot 281 is not separated from the hanger frame 211 of the side hanger 210 and may be moved by being synchronized with the first movable member 321. Therefore, in the exemplary embodiment of the present disclosure, it is possible to omit processes of separating the arm of the first handling robot 281 from the hanger frame 211, and then coupling the arm of the first handling robot 281 to the hanger frame 211 again.

On the other hand, in the exemplary embodiment of the present disclosure, the arms of the first handling robots 281 may also be separated from the hanger frames 211 when the side assemblies 3 are moved to both sides of the floor assembly 2 by the first movable members 321.

When the arm of the first handling robot 281 is separated from the hanger frame 211 as described above, driving power, which is provided to the side hanger 210 through the first handling robot 281, may be cut off.

Figure 10:
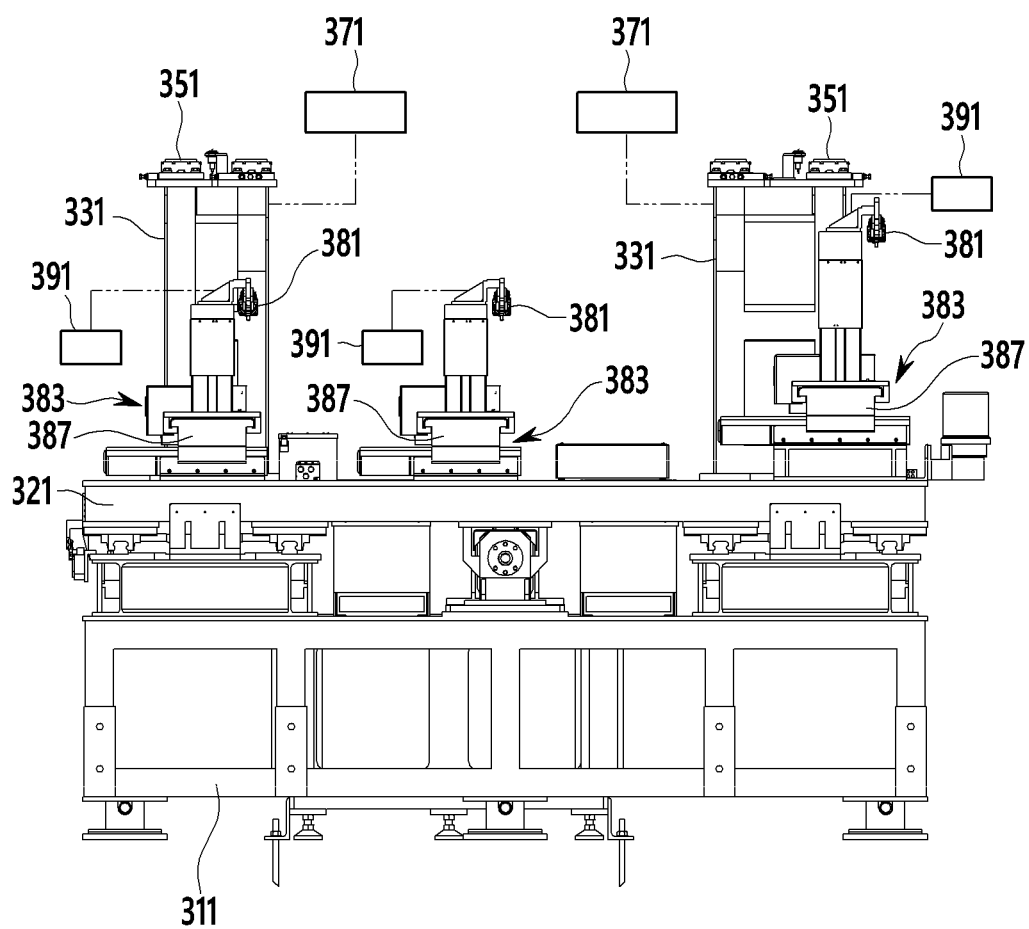
FIG. 10 is a front configuration diagram illustrating the guide post applied to the pre-buck unit of the vehicle body assembly system according to the exemplary embodiment of the present disclosure.

Therefore, as illustrated in FIG. 10, in the exemplary embodiment of the present disclosure, a driving power supply unit 371 for providing driving power to the side hanger 210 is installed on the post frame 331. Here, the driving power may include electric power, pneumatic pressure, a control signal, or the like for operating the first clamper 251 (see FIG. 5) of the side hanger 210. That is, the driving power supply unit 371 may include an electric power supply unit, an air supply unit, and a wireless communication unit.

On the other hand, as illustrated in FIGS. 7 and 10, the guide post 310 according to the exemplary embodiment of the present disclosure further includes a plurality of second clampers 381 which serves to clamp a lowest end portion of the side assembly 3 in a state in which the side hanger 210, which restricts the side assembly 3, is coupled to the hanger coupling unit 351 of the post frame 331.

The second clampers 381 are installed on the first movable member 321 so as to be spaced apart from each other at a predetermined interval in the vehicle body conveying direction separately from the side hanger 210. The second clamper 381 may clamp a lower portion side seal of the side assembly 3.

Here, the second clamper 381 may be installed to be reciprocally movable in the three-axis directions including the vehicle body conveying direction, the vehicle width direction, and the height direction by a fourth drive unit 383 so as to correspond to the side assembly 3 which varies in accordance with the type of vehicle.

The fourth drive unit 383 may reciprocally move the second clamper 381 in the three-axis directions by a fourth guide structure 387 of a known technology having a lead (or ball) screw, a cylinder rod, and a guide rail or the like that convert rotational force of a servomotor into rectilinear motion and rectilinearly move by a pneumatic cylinder.

Because the fourth drive unit 383 is configured as a three-axis electric drive body or moving device of a known technology, further description thereof will be omitted in the present specification.

Moreover, the exemplary embodiment of the present disclosure further includes a first position sensor 391 which detects a position of the side assembly 3 which varies in accordance with the type of vehicle, and controls the fourth drive unit 383 of the second clamper 381 based on a detection signal (see FIG. 10).

The first position sensor 391 is installed at a side of the second clamper 381. For example, the first position sensor 391 may include a laser displacement sensor which detects a position of a detection target by emitting laser toward the detection target and receiving the laser that is reflected by the detection target and returns back to the laser displacement sensor.

Therefore, in the exemplary embodiment of the present disclosure, it is possible to correct a restriction position of the second clamper 381 so that the position of the second clamper 381 corresponds to the side assembly 3, which varies in accordance with the type of vehicle, by applying a control signal to the fourth drive unit 383 by a controller based on a detection signal of the first position sensor 391 and changing the position of the second clamper 381 in the three-axis directions.

Referring to the aforementioned FIG. 1, the first welding robots 410 according to the exemplary embodiment of the present disclosure serve to weld the floor assembly 2 and the lower portions 4a of the side assemblies 3 which are exactly positioned at both sides of the floor assembly 2 by the side hangers 210 and the guide posts 310.

The plurality of first welding robots 410 is installed in the vehicle body conveying direction in the pre-buck section 20, and has a structure in which a spot welding device is mounted at a tip of an arm of a robot.

Because the first welding robot 410 is configured as a spot welding robot of a known technology, further description thereof will be omitted in the present specification.

Hereinafter, the main-buck unit 500 of the vehicle body assembly system 100 according to the exemplary embodiment of the present disclosure will be described in detail.

Referring to FIGS. 1 and 2, the main-buck unit 500 according to the exemplary embodiment of the present disclosure serves to post-assemble the vehicle body components to the side assembly 3 of the vehicle body which is conveyed to the main-buck section 50 through the carriage line 1 in a state in which the lower portion 4a of the side assembly 3 is preassembled to the floor assembly 2 by the pre-buck unit 200 in the pre-buck section 20.

That is, the main-buck unit 500 serves to weld the vehicle body components and the upper portion 4b of the side assembly 3 while restricting the upper portion 4b (see FIG. 3) of the side assembly 3 in the main-buck section 50. Here, the vehicle body components may include the cowl 7, the roof rail 8, and the package tray 9.

The main-buck units 500 are disposed at both sides of the conveying route of the carriage line 1 in the main-buck section 50, respectively.

Figure 11:
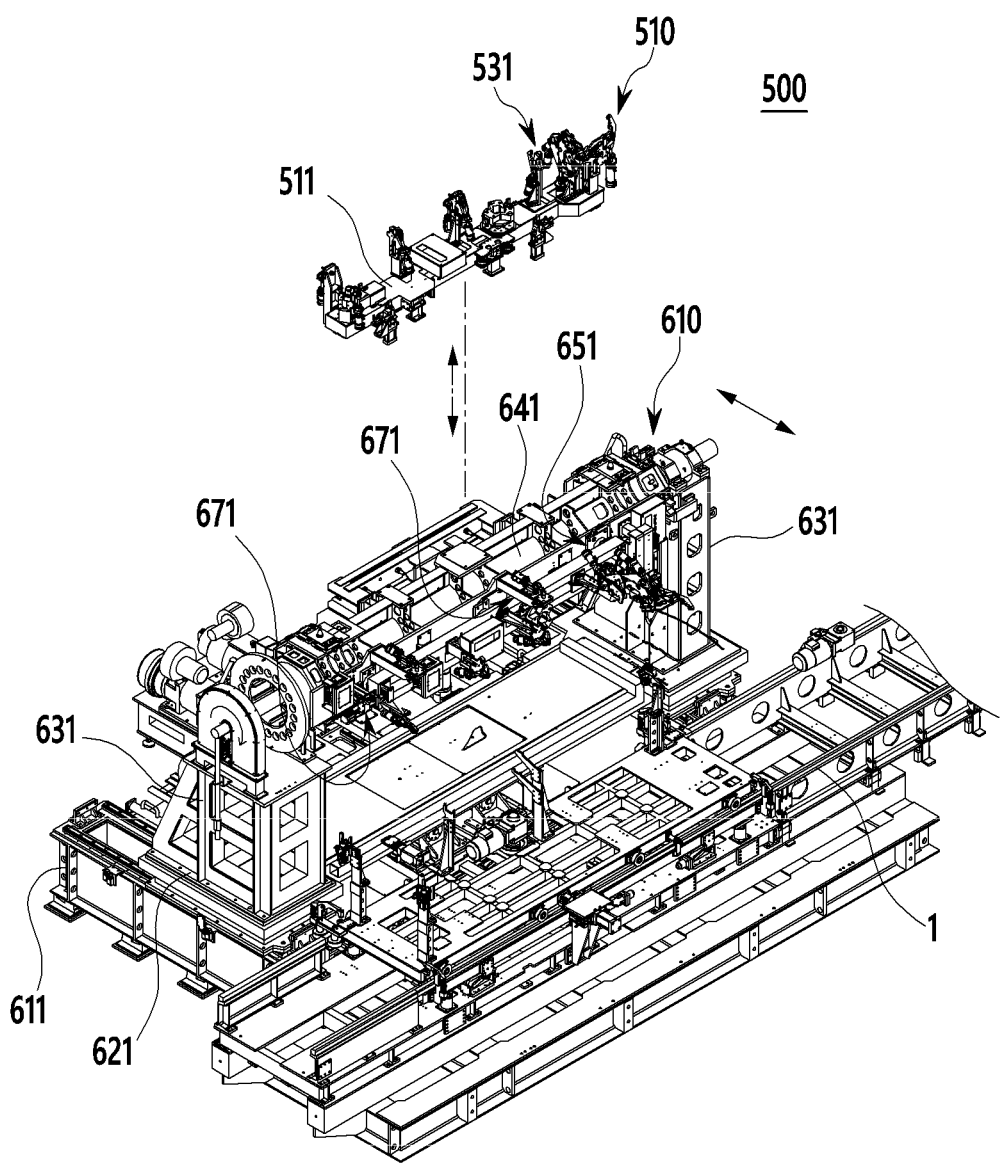
FIG. 11 is a perspective view illustrating the main-buck unit applied to the vehicle body assembly system according to the exemplary embodiment of the present disclosure.

FIG. 11 is a perspective view illustrating the main-buck unit applied to the vehicle body assembly system according to the exemplary embodiment of the present disclosure.

Referring to FIG. 11, along with FIGS. 1 and 2, the main-buck unit 500 according to the exemplary embodiment of the present disclosure includes side jigs 510, rotary indexers 610, a CRP loading unit 710, and second welding robots 810, which serve to post-assemble the vehicle body components to the upper portions 4b of the side assemblies 3 while restricting the vehicle width direction of the side assemblies 3.

In the exemplary embodiment of the present disclosure, the side jig 510 serves to restrict the vehicle width direction of the side assembly 3 by clamping or gripping the upper portion 4b of the side assembly 3 in the main-buck section 50. A plurality of side jigs 510 is provided to correspond to the side assemblies 3 which varies in accordance with the type of vehicle. Further, the side jig 510 is provided to be mountable on a second handling robot 581 in the main-buck section 50, and the side jig 510 may be attached to and detached from the rotary indexer 610 to be further described below in a replaceable manner by the second handling robot 581.

As described above, since the plurality of side jigs 510 is provided to correspond to the side assembly 3 which varies in accordance with the type of vehicle, the main-buck section 50 includes storage units 910 for storing the side jigs 510.

The side jigs 510 stored in the storage units 910 may be attached to or detached from the rotary indexer 610 in a replaceable manner by the second handling robots 581 in accordance with the side assembly 3 which varies in accordance with the type of vehicle.

Figure 12:
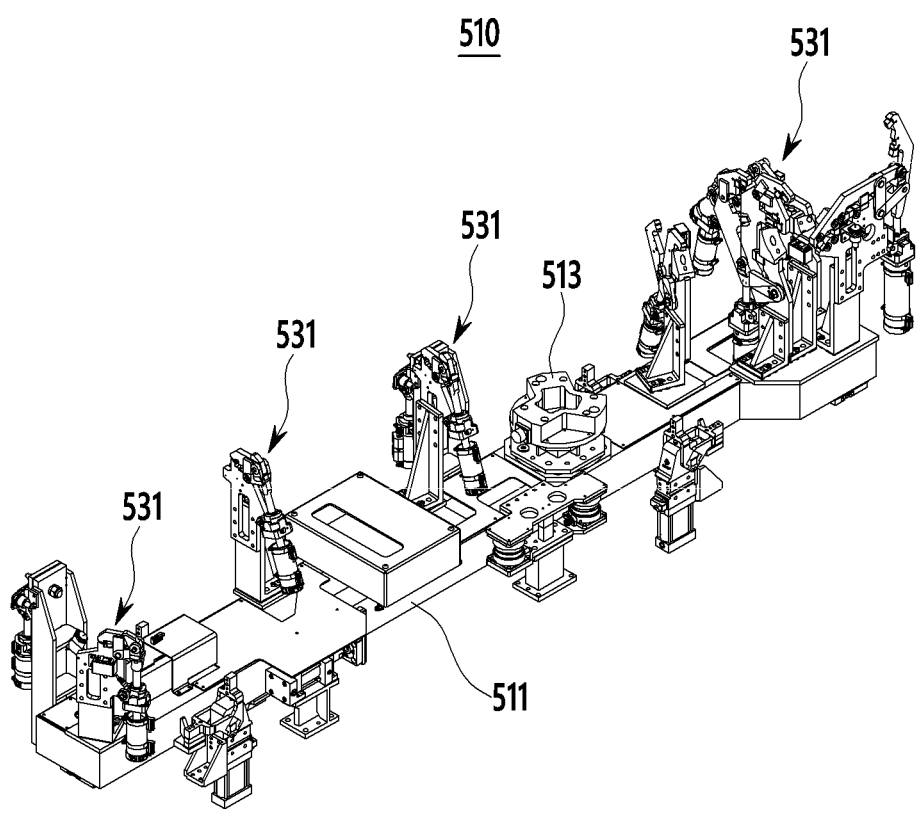
FIGS. 12 and 13 are perspective views illustrating a side jig applied to the main-buck unit of the vehicle body assembly system according to the exemplary embodiment of the present disclosure.
Figure 13:
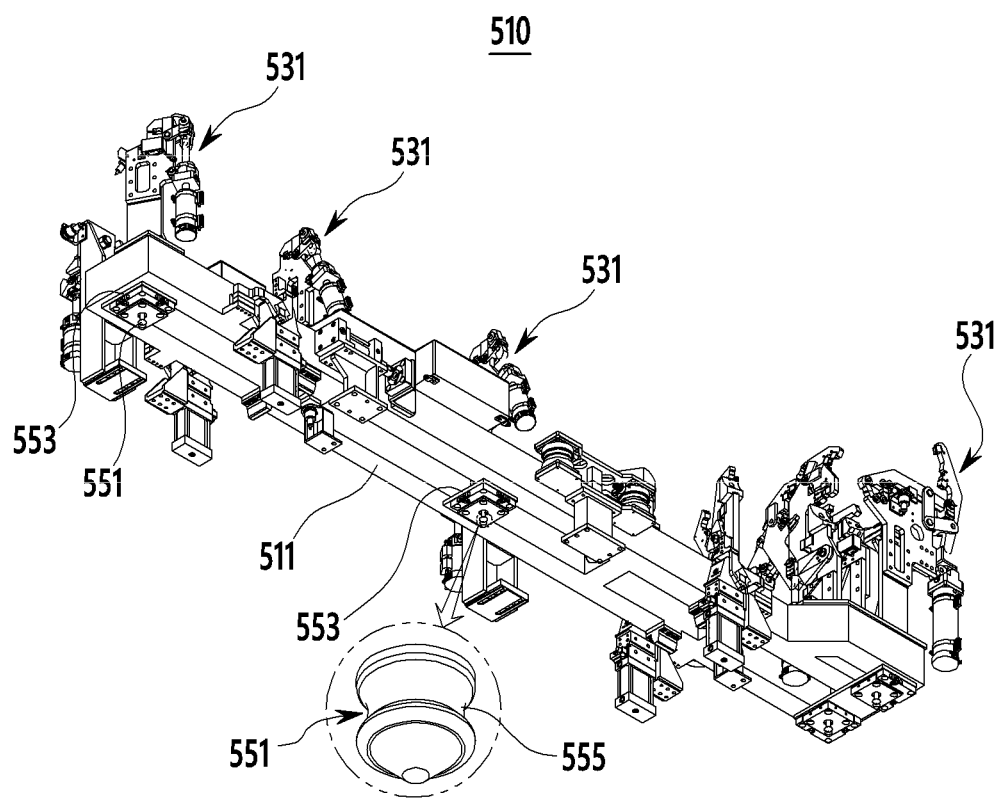

FIGS. 12 and 13 are perspective views illustrating the side jig applied to the main-buck unit of the vehicle body assembly system according to the exemplary embodiment of the present disclosure.

Referring to FIGS. 11 to 13, the side jig 510 according to the exemplary embodiment of the present disclosure basically includes a jig frame 511, third clampers 531, and second coupling pins 551.

The jig frame 511 is mounted at the tip of the arm of the second handling robot 581 (see FIG. 1) positioned in the main-buck section 50 (see FIG. 1). The jig frame 511 may be mounted at or separated from the tip of the arm of the second handling robot 581 by a tool changer 513.

The third clamper 531 serves to restrict the vehicle width direction of the side assembly 3 by clamping the upper portion 4b of the side assembly 3 in the main-buck section 50, and a plurality of third clampers 531 is installed on the jig frame 511.

The third clampers 531 are installed at both end portions of the jig frame 511, respectively, and the plurality of third clampers 531 is installed between both end portions of the jig frame 511. The third clampers 531, which are provided at both end portions of the jig frame 511, may clamp a front side and a rear side (the rear combination lamp portion) of the upper portion 4b of the side assembly 3. Further, the plurality of third clampers 531, which is provided between both end portions of the jig frame 511, may clamp a pillar side of the upper portion 4b of the side assembly 3.

The second coupling pin 551 serves to couple the jig frame 511 to the rotary indexer 610 to be further described below. A plurality of second coupling pins 551 is installed on a rear surface of the jig frame 511. The second coupling pin 551 is installed on the rear surface of the jig frame 511 by a second mounting bracket 553 so as to protrude rearward.

The second coupling pin 551 has a second ball coupling groove 555 which is formed in a circumferential direction of a cylindrical shape and has a rounded shape. The coupling structure between the second coupling pin 551 and the rotary indexer 610 will be described below in more detail.

Figure 14:
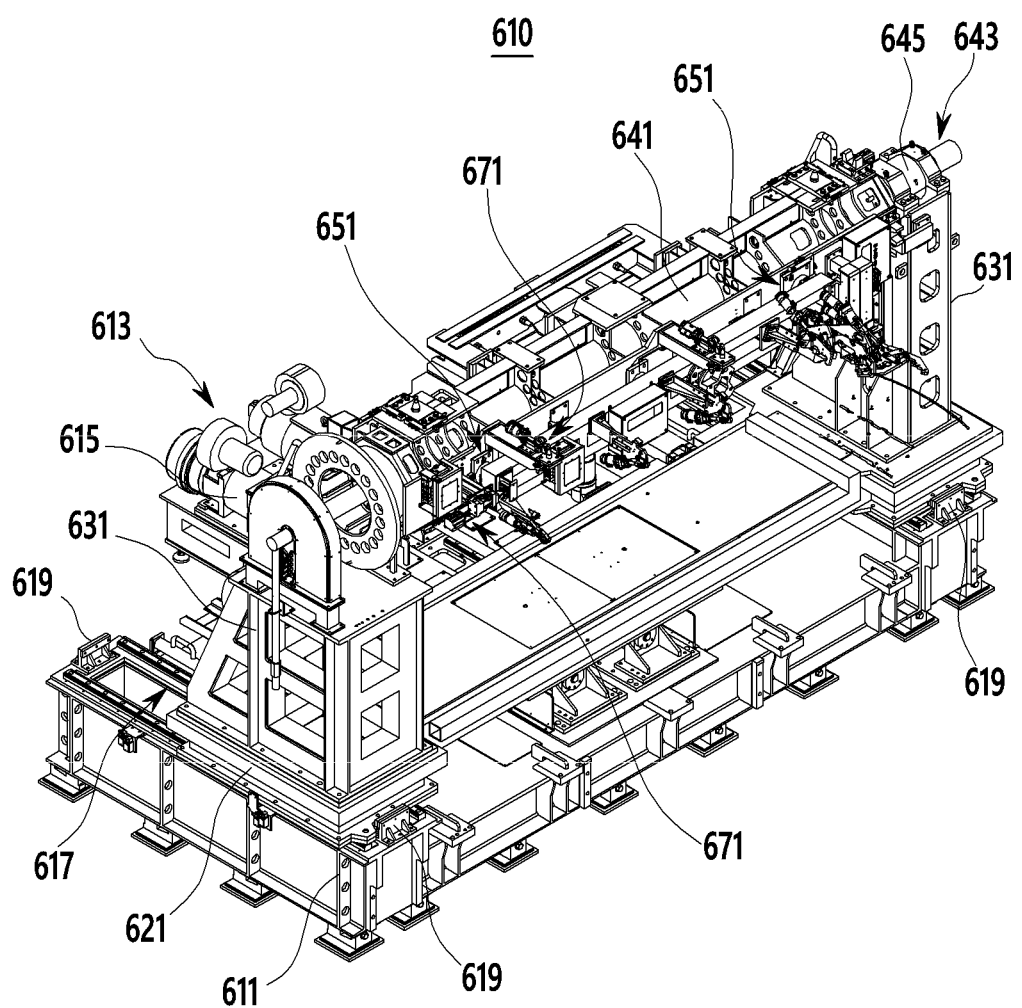
FIG. 14 is a perspective view illustrating the rotary indexer applied to the main-buck unit of the vehicle body assembly system according to the exemplary embodiment of the present disclosure.

FIG. 14 is a perspective view illustrating the rotary indexer applied to the main-buck unit of the vehicle body assembly system according to the exemplary embodiment of the present disclosure.

Referring to FIGS. 11 and 14, the rotary indexer 610 according to the exemplary embodiment of the present disclosure is coupled with the side jigs 510 in order to restrict the upper portion 4b of the side assembly 3 to the exact position by the side jig 510 in the main-buck section 50.

Moreover, the rotary indexer 610 according to the exemplary embodiment of the present disclosure serves to restrict the position variation of the side assembly 3 and minimize the assembly variation of the side assembly 3.

Further, the rotary indexer 610 according to the exemplary embodiment of the present disclosure serves to restrict the upper portion 4b of the side assembly 3 by selecting the side jig 510, which corresponds to the target vehicle type, in a rotary manner in a state in which the plurality of side jigs 510, which correspond to the respective side assemblies 3 which vary in accordance with the type of vehicle, is installed on the rotary indexer 610.

The rotary indexers 610 may be disposed at both sides of the conveying route in the main-buck section 50, coupled with the side jigs 510, installed to be rotatable at a preset angle, and configured on the main-buck frames 611 so as to be reciprocally movable in the vehicle width direction.

The rotary indexer 610 includes second movable members 621, indexer frames 631, a rotating body 641, jig coupling units 651, and fourth clampers 671.

The second movable members 621 are installed on the main-buck frames 611 at both sides of the conveying route in the main-buck section 50 so as to be reciprocally movable in the vehicle width direction by fifth drive units 613 with respect to the side assemblies 3 of which the lower portions are preassembled to the floor assembly 2.

For example, the second movable member 621 has a plate shape, and is installed on an upper surface of the main-buck frame 611 so as to be reciprocally movable in the vehicle width direction by the fifth drive unit 613.

Here, the fifth drive unit 613 serves to reciprocally move the second movable member 621 in the vehicle width direction. The fifth drive unit 613 may reciprocally move the second movable member 621 in the vehicle width direction by a fifth guide structure 617 of a known technology which has a lead (or ball) screw and a guide rail or the like that convert rotational force of a fifth servomotor 615 into rectilinear motion.

Because the fifth drive unit 613 is configured as an electric drive body or moving device of a known technology, further description thereof will be omitted in the present specification.

Meanwhile, second stoppers 619 for exactly positioning the second movable member 621, which is moved in the vehicle width direction by the fifth drive unit 613, may be provided on the main-buck frame 611. The second stoppers 619 may be installed at both ends of a guide rail on the main-buck frame 611, respectively.

The indexer frames 631 allow the rotating body 641, which will be further described below, to be rotatably installed, and a pair of indexer frames 631 is installed on the second movable members 621 so as to be spaced apart from each other in the vehicle body conveying direction.

The indexer frame 631 has a structure in which a plurality of metal bars is connected to one another in the vehicle body conveying direction, the vehicle width direction, and the height direction, and the indexer frames 631 may be uprightly installed on the second movable members 621 at a predetermined interval in the vehicle body conveying direction.

The rotating body 641 has four sides at which the side jigs 510, which correspond to the respective side assemblies 3 that vary in accordance with the type of vehicle, are coupled by the second handling robot 581 and at which the side jigs 510 may be replaced in a detachable manner, and the rotating body 641 is rotatably installed on the indexer frames 631.

Both ends of the rotating body 641 are rotatably supported by the indexer frames 631, and the rotating body 641 may be rotated at a preset angle (90 degrees) by a sixth drive unit 643. For example, the sixth drive unit 643 includes a sixth servomotor 645 fixedly installed on the indexer frame 631.

As illustrated in FIGS. 12 and 13, the jig coupling unit 651 serves to couple the jig frame 511 of the side jig 510 to the rotating body 641. A plurality of jig coupling units 651 is installed at respective sides of the rotating body 641. The jig coupling unit 651 has a structure that may be pin-coupled with the second coupling pin 551 provided on the jig frame 511 and may clamp the second coupling pin 551.

Referring to FIGS. 12 and 13, along with FIGS. 8 and 9, the jig coupling unit 651 according to the exemplary embodiment of the present disclosure includes a second pin housing 653 and a second ball clamp 655.

The second pin housing 653 is fixedly installed at each side of the rotating body 641. The second coupling pin 551 of the side jig 510 is fitted with the second pin housing 653.

The second ball clamp 655 clamps the second coupling pin 551 fitted with the second pin housing 653 by using a plurality of balls 656 and air pressure, and the second ball clamp 655 is installed in the second pin housing 653.

For example, the second ball clamp 655 includes a support race 657 which supports the balls 656 so that the balls 656 may roll, a pair of second race members 658 which is installed to be movable from the outside to the center of the second coupling pin 551 in the circumferential direction, and a seventh drive unit 659 which provides driving pressure to the second race members 658.

The support race 657 is provided as a circular race that supports the balls 656 so that the balls 656 may roll, and the second race members 658 serve to press the balls 656 by moving from the outside to the center of the second coupling pin 551 in the circumferential direction.

Further, the seventh drive unit 659 provides air pressure to the second race members 658, and the seventh drive unit 659 is provided as an air supply source that moves the second race member 658 from the outside to the center of the second coupling pin 551 in the circumferential direction in order to press the balls 656.

When the second coupling pin 551 is not coupled to the second pin housing 653 as illustrated in FIG. 8, the seventh drive unit 659 of the second ball clamp 655 does not provide air pressure to the second race members 658, and in this case, the balls 656 are held by the support race 657 in a state in which the balls 656 may freely roll.

In addition, when the second coupling pin 551 is coupled to the second pin housing 653 as illustrated in FIG. 9, the seventh drive unit 659 of the second ball clamp 655 provides air pressure to the second race member 658, and the second race members 658 are moved by the air pressure from the outside to the center of the second coupling pin 551 in the circumferential direction, thereby pressing the balls 656 on the support race 657.

Therefore, the balls 656 may be coupled to the second ball coupling groove 555 of the second coupling pin 551 by the second race members 656, thereby securely fixing the second coupling pin 551 to the second pin housing 653.

Therefore, in the exemplary embodiment of the present disclosure, the ball-clamping type jig coupling unit 651 clamps the second coupling pin 551 of the side jig 510, thereby coupling the side jig 510 to each side of the rotating body 641.

The jig coupling units 651 may be installed on the rotating body 641 so as to have a triangular shape in order to more stably couple the side jig 510 to the rotating body 641.

As illustrated in FIGS. 11 and 14, the fourth clamper 671 serves to fix the side jig 510 to the rotating body 641, and a plurality of fourth clampers 671 is installed at respective sides of the rotating body 641.

The fourth clampers 671 are installed at both sides of the respective sides of the rotating body 641. For example, the fourth clamper 671 may be provided as a pin clamper that may be operated forward and rearward by a pneumatic cylinder and pin-coupled to the jig frame 511 of the side jig 510.

Figure 15:
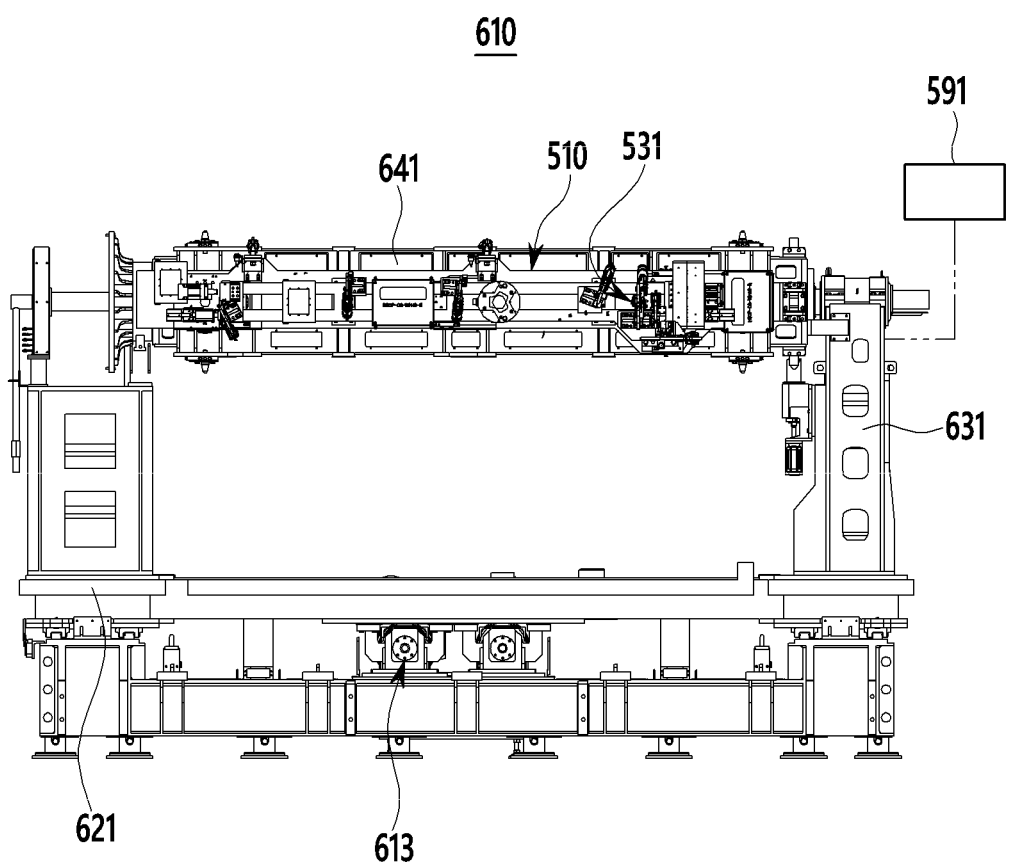
FIG. 15 is a front configuration diagram illustrating the rotary indexer applied to the main-buck unit of the vehicle body assembly system according to the exemplary embodiment of the present disclosure.

Meanwhile, as illustrated in FIG. 15, the exemplary embodiment of the present disclosure further includes a second position sensor 591 which detects a position of the side assembly 3 in a state in which the upper portion of the side assembly 3 is restricted by the third clampers 531 of the side jig 510 after the rotating body 641 coupled with the side jigs 510 is moved to the side assembly 3.

The second position sensor 591 is provided as a position sensor which detects a position of the side assembly 3 and controls the fifth drive unit 613 of the second movable member 621 based on a detection signal, and the second position sensor 591 is installed on the indexer frame 631.

For example, the second position sensor 591 may include a laser displacement sensor which detects a position of a detection target by emitting laser toward the detection target and receiving the laser that is reflected by the detection target and returns back to the laser displacement sensor.

In the exemplary embodiment of the present disclosure, a position of the side assembly 3 is detected by the second position sensor 591 and the detection signal is outputted to the controller (not illustrated in the drawings) in a state in which the upper portion of the side assembly 3 is restricted by the third clampers 531 of the side jig 510.

Therefore, in the exemplary embodiment of the present disclosure, it is possible to correct a restriction position of the side assembly 3 by applying a control signal to the fifth drive unit 613 through the controller based on a detection signal of the second position sensor 591 and moving the second movable member 621 in the vehicle width direction.

Alternatively, the present disclosure is not necessarily limited to the configuration in which the second position sensor 591 is installed on the indexer frame 631, and the second position sensor 591 may be installed on each of the third clampers 531 of the side jig 510.

Figure 16:
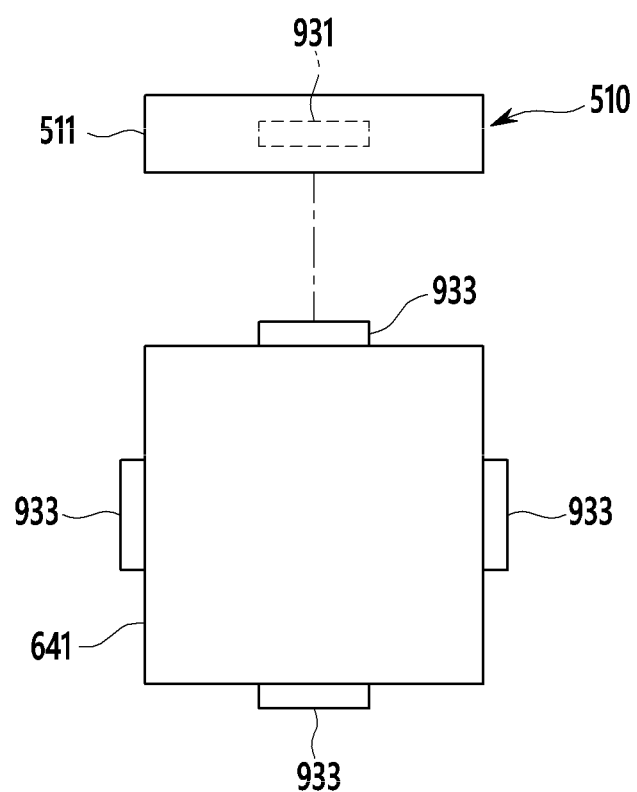
FIG. 16 is a view schematically illustrating a vehicle type recognition structure of the side jig applied to the main-buck unit of the vehicle body assembly system according to the exemplary embodiment of the present disclosure.

On the other hand, as illustrated in FIG. 16, a vehicle type tag 931 may be mounted on the jig frame 511 of the side jig 510, and a tag reader 933 may be mounted at each side of the rotating body 641.

Since the plurality of side jigs 510 is provided to correspond to the respective side assemblies 3 that vary in accordance with the type of vehicle, the vehicle type tag 931 stores vehicle type information related to the respective side jigs 510. The tag reader 933 serves to recognize the vehicle type information related to the respective side jigs 510 by the controller.

Referring to FIG. 2, the CRP loading unit 710 according to the exemplary embodiment of the present disclosure serves to convey the vehicle body components including the cowl 7, the roof rail 8, and the package tray 9 to the upper portion 4b of the side assembly 3 restricted by the side jig 510, and to exactly position the vehicle body components to the upper portion 4b. Here, the CRP is a combination of 'C' which is the abbreviation of 'Cowl', 'R' which is the abbreviation of 'Roof rail', and 'P' which is the abbreviation of 'Package tray'.

The CRP loading unit 710 is provided above the conveying route of the carriage line 1 so as to be movable along the conveying route, and installed to be movable upward and downward with respect to the upper portion of the side assembly 3 in the main-buck section 50.

The CRP loading unit 710 restricts the positions of the cowl 7, the roof rail 8, and the package tray 9, and includes various types of clamping devices for clamping the vehicle body components and various types of restricting devices for restricting the vehicle body components.

Referring to the aforementioned FIGS. 1 and 2, the second welding robots 810 according to the exemplary embodiment of the present disclosure serve to weld the vehicle body components and the upper portions 4b of the side assemblies 3.

The second welding robot 810 welds the vehicle body components and the upper portion 4b of the side assembly 3 in a state in which the upper portion 4b of the side assembly 3 is restricted by the side jig 510 and the rotary indexer 610, and the vehicle body components such as the cowl 7, the roof rail 8, and the package tray 9 are exactly positioned on the upper portion 4b of the side assembly 3 by the CRP loading unit 710.

The plurality of second welding robots 810 is installed in the vehicle body conveying direction in the main-buck section 50, and has a structure in which a spot welding device is mounted at a tip of an arm of a robot. Because the second welding robot 810 is configured as a spot welding robot of a known technology, further description thereof will be omitted in the present specification.

Hereinafter, an operation of the vehicle body assembly system 100 according to the exemplary embodiment of the present disclosure which is configured as described above and a process of assembling a vehicle body will be described in detail with reference to the aforementioned drawings.

First, in the exemplary embodiment of the present disclosure, the floor assembly 2 assembled in the sub assembly line is conveyed to the pre-buck section 20 along the preset conveying route through the carriage line 1.

The side hanger 210 of the pre-buck unit 200 is in a state of being mounted at the tip of the arm of the first handling robot 281 in the pre-buck section 20. Further, the guide posts 310 of the pre-buck unit 200 are in a state of being moved rearward in a direction (the vehicle width direction) far away from the floor assembly 2 at both sides of the conveying route by the second drive units 313.

In addition, the side assembly 3, which varies in accordance with the type of vehicle, is conveyed to the pre-buck section 20 by the conveying hanger 110, and in the exemplary embodiment of the present disclosure, the side assembly 3 is unloaded from the conveying hanger 110 by the robot hanger 290.

The robot hanger 290 clamps the side assembly 3 in a state in which the side assembly 3 is aligned to a preset position by the alignment jig 293. In this state, in the exemplary embodiment of the present disclosure, the side assembly 3 is loaded to the side hanger 210 in a robot-to-robot manner by the robot hanger 290.

Here, the reference pin 231 of the side hanger 210 is fitted with the reference hole 6 of the side assembly 3, thereby adjusting a reference position of the side assembly 3. Further, the first clampers 251 of the side hanger 210 clamp the lower portion 4a of the side assembly 3.

In this case, the first clampers 251 provided at both end portions of the hanger frame 211 of the side hanger 210 clamp the front side and the rear side (the rear combination lamp portion) of the side assembly 3.

Further, the plurality of first clampers 251 provided between both end portions of the hanger frame 211 clamps the front pillar 5a, the center pillar 5b, and the rear pillar 5c of the side assembly 3, respectively.

In this case, the plurality of first clampers 251 provided between both end portions of the hanger frame 211 clamps the front pillar 5a, the center pillar 5b, and the rear pillar 5c of the side assembly 3, respectively, in a state in which the plurality of first clampers 251 is moved in the vehicle body conveying direction by the first drive unit 253 in accordance with the positions of the pillar portions of the side assembly 3 which varies in accordance with the type of vehicle.

Meanwhile, in the exemplary embodiment of the present disclosure, the first clamper 251 may be additionally mounted on the mounting seat 261 of the hanger frame 211 so as to correspond to the side assembly 3 which varies in accordance with the type of vehicle.

In this state, in the exemplary embodiment of the present disclosure, the side hanger 210, which restricts the side assembly 3, is conveyed to the guide post 310 by the first handling robot 281.

Thereafter, in the exemplary embodiment of the present disclosure, the side hanger 210 is coupled to the post frame 331 of the guide post 310 by the first handling robot 281, and in this case, the first coupling pin 271 provided on the hanger frame 211 is coupled to the hanger coupling unit 351 of the post frame 331.

This process will be more specifically described. Before the first coupling pin 271 is coupled to the first pin housing 353 of the hanger coupling unit 351, the third drive unit 359 of the first ball clamp 355 of the hanger coupling unit 351 does not provide air pressure to the first race members 358, and in this case, the balls 356 are held by the support race 357 in a state in which the balls 356 may free roll.

In this state, in the exemplary embodiment of the present disclosure, when the first coupling pin 271 is coupled to the first pin housing 353, the third drive unit 359 provides air pressure to the first race members 358.

Then, the first race members 358 are moved by the air pressure from the outside to the center of the first coupling pin 271 in the circumferential direction, thereby pressing the balls 356 on the support race 357.

Here, the balls 356 are coupled to the first ball coupling groove 275 of the first coupling pin 271 by the first race members 358, thereby fixing the first coupling pin 271 to the first pin housing 353.

Therefore, in the exemplary embodiment of the present disclosure, the ball-clamping type hanger coupling unit 351 clamps the first coupling pin 271 of the side hanger 210, thereby coupling the side hanger 210 to the post frame 331.

In the exemplary embodiment of the present disclosure, the lower portion side seal of the side assembly 3 is clamped by the second clampers 381 on the first movable member 321 in a state in which the side hanger 210, which restricts the side assembly 3 as described above, is coupled to the hanger coupling unit 351 of the post frame 331.

Here, the second clamper 381 may clamp the lower portion side seal of the side assembly 3 by being moved in the three-axis directions including the vehicle body conveying direction, the vehicle width direction, and the height direction by the fourth drive unit 383 so as to correspond to the side assembly 3 which varies in accordance with the type of vehicle.

In this case, in the exemplary embodiment of the present disclosure, the first position sensor 391 detects a position of the side assembly 3, and the detection signal is outputted to the controller. Therefore, in the exemplary embodiment of the present disclosure, it is possible to correct the restriction positions of the second dampers 381 so that the positions of the second clampers 381 correspond to the side assembly 3, which varies in accordance with the type of vehicle, by applying a control signal to the fourth drive unit 383 by a controller based on a detection signal of the first position sensor 391 and changing the position of the second clamper 381 in the three-axis directions.

Then, in the exemplary embodiment of the present disclosure, the first movable members 321 of the guide posts 310 are moved forward to both sides of the floor assembly 2 in the vehicle width direction by the operation of the second drive units 313. That is, in the exemplary embodiment of the present disclosure, the side hangers 210, which are coupled to the post frames 331 on the first movable members 321, and the side assemblies 3, which are restricted by the second clampers 381 on the first movable members 321, are moved to both sides of the floor assembly 2 by the first movable members 321.

During this process, in the exemplary embodiment of the present disclosure, the arm of the first handling robot 281 is not separated from the hanger frame 211 of the side hanger 210, and the first handling robot 281 may be moved by being synchronized with the first movable member 321.

Alternatively, in the exemplary embodiment of the present disclosure, the arm of the first handling robot 281 may be separated from the hanger frame 211. In this case, the driving power supply unit 371 provided on the frame 331 supplies driving power, such as electric power, pneumatic pressure, and a control signal, to the first damper 251 of the side hanger 210 or the like.

In the exemplary embodiment of the present disclosure, since the side assemblies 3 are moved to both sides of the floor assembly 2 by the guide posts 310 as described above, the side assemblies 3 may be accurately matched with both sides of the floor assembly 2.

Further, in the exemplary embodiment of the present disclosure, since the position variation of the side assembly 3, which may occur when the first handling robot 281 handles the side hanger 210 that restricts the side assembly 3, is restricted by the guide post 310, it is possible to minimize the assembly variation of the side assemblies 3 with respect to both sides of the floor assembly 2.

Therefore, in the exemplary embodiment of the present disclosure, since the vehicle body conveying direction and the height direction of the side assembly 3 are restricted by the side hanger 210 and the second clampers 381, it is possible to exactly position the lower portions 4a of the side assemblies 3 at both sides of the floor assembly 2.

In this state, in the exemplary embodiment of the present disclosure, the first welding robots 410 weld the lower portions 4a of the side assemblies 3 and the floor assembly 2, thereby preassembling the lower portions 4a of the side assemblies 3 to both sides of the floor assembly 2.

In the exemplary embodiment of the present disclosure, in a state in which the lower portions 4a of the side assemblies 3 are preassembled to both sides of the floor assembly 2 by the pre-buck unit 200 in the pre-buck section 20 through the aforementioned series of processes, the preassembled vehicle body is conveyed to the main-buck section 50 along the conveying route of the carriage line 1.

In the exemplary embodiment of the present disclosure, the plurality of side jigs 510, which correspond to the respective side assemblies 3 that vary in accordance with the type of vehicle, is stored in the storage units 910 in the main-buck section 50.

Further, the side jigs 510, which correspond to the respective side assemblies 3 that vary in accordance with the type of vehicle, are coupled to the respective sides of the rotating body 641 of the rotary indexer 610 of the main-buck unit 500 in the main-buck section 50. Here, the rotary indexers 610 are in a state of being moved rearward in the direction (the vehicle width direction) far away from the preassembled vehicle body by the fifth drive units 613 at both sides of the conveying route.

In the exemplary embodiment of the present disclosure, in a state in which the vehicle body preassembled in the pre-buck section 20 is conveyed to the main-buck section 50 as described above, the rotating body 641 of the rotary indexer 610 is rotated by the sixth drive unit 643, and the side jig 510, which corresponds to the target vehicle type and corresponds to the side assembly 3 which varies in accordance with the type of vehicle, is positioned on the side assembly 3 of the preassembled vehicle body.

Then, in the exemplary embodiment of the present disclosure, the second movable members 621 of the rotary indexer 610 are moved forward toward the side assembly 3 in the vehicle width direction by the operation of the fifth drive unit 613.

That is, in the exemplary embodiment of the present disclosure, the rotating body 641, on which the side jigs 510 are mounted in a state in which the rotating body 641 is supported by the indexer frames 631 on the second movable members 621, is moved forward toward the side assembly 3 by the second movable members 621.

Thereafter, in the exemplary embodiment of the present disclosure, the upper portion 4b of the side assembly 3 is clamped by the third clampers 531 of the side jig 510, thereby restricting the vehicle width direction of the side assembly 3.

Here, the third clampers 531 provided at both end portions of the jig frame 511 of the side jig 510 clamp the front side and the rear side (the rear combination lamp portion) of the upper portion 4b of the side assembly 3. Further, the plurality of third clampers 531, which is provided between both end portions of the jig frame 511, clamps a pillar side of the upper portion 4b of the side assembly 3.

In this case, in the exemplary embodiment of the present disclosure, the second position sensor 591 detects a position of the side assembly 3, and the detection signal is outputted to the controller. Therefore, in the exemplary embodiment of the present disclosure, it is possible to correct a restriction position of the side assembly 3 by applying a control signal to the fifth drive unit 613 through the controller based on a detection signal of the second position sensor 591 and moving the second movable member 621 in the vehicle width direction.

Then, in the exemplary embodiment of the present disclosure, the CRP loading unit 710, which is conveyed to the main-buck section 50 along the conveying route above the conveying route of the carriage line 1, is moved downward toward the upper portion of the side assembly 3.

The CRP loading unit 710 is moved downward toward the upper portion of the side assembly 3 in a state in which the vehicle body components such as the cowl 7, the roof rail 8, and the package tray 9 are restricted. The vehicle body components such as the cowl 7, the roof rail 8, and the package tray 9 are exactly positioned on the upper portion 4b of the side assembly 3 by the CRP loading unit 710.

In this state, in the exemplary embodiment of the present disclosure, the second welding robots 810 weld the vehicle body components and the upper portions 4b of the side assemblies 3.

Meanwhile, in the exemplary embodiment of the present disclosure, the side jig 510 coupled to the rotating body 641 may be replaced with the side jig 510 that corresponds to the side assembly 3 for another type of vehicle.

In this case, in the exemplary embodiment of the present disclosure, during the process in which the second welding robot 810 welds the vehicle body components and the upper portion 4b of the side assembly 3 as described above, the side jig 510 coupled to the upper surface of the rotating body 641 may be replaced with the side jig 510, which corresponds to the side assembly 3 for another type of vehicle, by the second handling robot 581.

In the exemplary embodiment of the present disclosure, another side jig 510 is coupled to the upper surface of the rotating body 641 by the second handling robot 581 in a state in which the side jig 510 coupled to the upper surface of the rotating body 641 is separated from the rotating body 641 by the second handling robot 581 or in a state in which no side jig 510 is coupled to the upper surface of the rotating body 641. In the exemplary embodiment of the present disclosure, the second coupling pin 551 provided on the jig frame 511 of the side jig 510 is coupled to the jig coupling unit 651 of the rotating body 641.

This process will be more specifically described. Before the second coupling pin 551 is coupled to the second pin housing 653 of the jig coupling unit 651, the seventh drive unit 659 of the second ball clamp 655 of the jig coupling unit 651 does not provide air pressure to the second race members 658, and in this case, the balls 656 are held by the support race 657 in a state in which the balls 656 may freely roll.

In this state, in the exemplary embodiment of the present disclosure, when the second coupling pin 551 is coupled to the second pin housing 653, the seventh drive unit 659 provides air pressure to the second race members 658. Then, the second race members 658 are moved by the air pressure from the outside to the center of the second coupling pin 551 in the circumferential direction, thereby pressing the balls 656 on the support race 657.

Here, the balls 656 are coupled to the second ball coupling groove 555 of the second coupling pin 551 by the second race member 656, thereby fixing the second coupling pin 551 to the second pin housing 653.

Therefore, in the exemplary embodiment of the present disclosure, the ball-clamping type jig coupling unit 651 clamps the second coupling pin 551 of the side jig 510, thereby coupling the side jig 510 to the upper surface of the rotating body 641.

Further, in the exemplary embodiment of the present disclosure, in a state in which the side jig 510 is coupled to the rotating body 641 by the jig coupling unit 651, the jig frame 511 of the side jig 510 is fixed to the rotating body 641 by the fourth clamper 671 provided on the rotating body 641. The fourth clamper 671 is pin-coupled to the jig frame 511 of the side jig 510 by the pneumatic cylinder, thereby fixing the jig frame 511 to the rotating body 641.

As described above, in the exemplary embodiment of the present disclosure, the upper portion 4b of the side assembly 3 and the vehicle body components are assembled by the main-buck unit 500 in the main-buck section 50 through the aforementioned series of processes.

Meanwhile, among the aforementioned series of processes, the process in which the replaceable side jig 510 on the rotating body 641 corresponds to various types of vehicles will be more specifically described. The tag readers 933 installed at the respective sides of the rotating body 641 receive vehicle type information stored in the vehicle type tag 931 of the side jig 510, and output the vehicle type information to the controller. Further, in the exemplary embodiment of the present disclosure, the vehicle type information for the side jig 510 corresponding to the type of vehicle being currently manufactured and the vehicle type information for the side jig 510 corresponding to the type of vehicle to be manufactured subsequently are checked.

Then, the controller determines whether the side jig 510, which corresponds to the type of vehicle to be manufactured subsequently, is coupled to a coupling surface of the rotating body 641 in addition to the side jig 510 that corresponds to the type of vehicle being currently manufactured.

Here, in the exemplary embodiment of the present disclosure, when the controller determines that the side jig 510, which corresponds to the type of vehicle to be manufactured subsequently, is coupled to the rotating body 641, the operations of assembling the side assemblies 3 corresponding to the type of vehicle being currently manufactured and assembling the side assemblies 3 corresponding to the type of vehicle to be manufactured subsequently are carried out by rotating the rotating body 641 and moving the rotating body 641 forward and rearward by the rotary indexer 610.

In the exemplary embodiment of the present disclosure, if the controller determines that no side jig 510 corresponding to the type of vehicle to be manufactured subsequently is coupled to the rotating body 641, the side jig 510 mounted on the upper surface (−1 surface) of the rotating body 641 is separated and unloaded to the storage unit 910 when the side assemblies 3 corresponding to the type of vehicle being currently manufactured are assembled.

Thereafter, in the exemplary embodiment of the present disclosure, the side jig 510 corresponding to the type of vehicle to be manufactured subsequently is drawn out of the storage unit 910, and the side jig 510 corresponding to the type of vehicle to be manufactured subsequently is coupled to the upper surface of the rotating body 641 when the rotating body 641 is moved rearward after the process of assembling the side assemblies 3 corresponding to the type of vehicle being currently manufactured is completed.

According to the vehicle body assembly system 100 according to the exemplary embodiment of the present disclosure which has been described above, the lower portions 4a of the side assemblies 3 may be preassembled to the floor assembly 2 by the pre-buck unit 200 in the pre-buck section 20, and the vehicle body components may be post-assembled to the upper portions 4b of the side assemblies 3 by the main-buck unit 500 in the main-buck section 50.

Therefore, in the exemplary embodiment of the present disclosure, since the vehicle body assembly process is divided into the two processes unlike the related art in which a framework of a vehicle body is formed by a single process, it is possible to assemble vehicle bodies so as to correspond to various types of vehicles such as at least five types of vehicles, and to apply the vehicle body assembly system to various types of vehicles in common by using the robots.

Therefore, in the exemplary embodiment of the present disclosure, it is possible to flexibly produce various types of vehicles, reduce time required to prepare the facility, achieve a reduction in weight of the entire facility, simplify the entire facility, and reduce initial investment costs and investment costs when the type of vehicle is added.

While this disclosure has been described in connection with what is presently considered to be practical example embodiments, it is to be understood that the disclosure is not limited to the disclosed embodiments, but, on the contrary, is intended to cover various modifications and equivalent arrangements included within the spirit and scope of the appended claims.

What is claimed is:

1. A vehicle body assembly system which defines a pre-buck section and a main-buck section along a conveying route of a floor assembly, the vehicle body assembly system comprising:
    a side hanger which is mounted on a first handling robot in the pre-buck section and restricts a lower portion of a side assembly that varies in accordance with a type of vehicle;
    a guide post which is coupled with the side hanger, which restricts the side assembly in the pre-buck section, and installed to be reciprocally movable in a vehicle width direction at each of both sides of the conveying route;
    at least one first welding robot which is installed in the pre-buck section and welds the lower portion of the side assembly and the floor assembly;
    a plurality of side jigs which is provided to be mountable on a second handling robot in the main-buck section and restricts an upper portion of the side assembly that varies in accordance with the type of vehicle;
    a rotary indexer which is coupled with the side jigs in the main-buck section, provided to be rotatable at a preset angle, and installed to be reciprocally movable in the vehicle width direction at each of both sides of the conveying route; and
    at least one second welding robot which is installed in the main-buck section and welds the upper portion of the side assembly and vehicle body components.

2. The vehicle body assembly system of claim 1, wherein the rotary indexer includes:
    a second movable member which is installed on a main-buck frame at each of both sides of the conveying route so as to be reciprocally movable in the vehicle width direction by a drive unit;
    a pair of indexer frames which is installed on the second movable member so as to be spaced apart from each other;
    a rotating body which has four sides at which the side jigs, which vary in accordance with the type of vehicle, are attached and detached, and are installed on the indexer frames so as to be rotatable by a drive unit;
    a plurality of jig coupling units which is provided at the respective sides of the rotating body and pin-coupled to the side jigs; and
    a plurality of fourth clampers which is installed at the respective sides of the rotating body and fixes the side jigs to the rotating body.

3. The vehicle body assembly system of claim 2, wherein the jig coupling unit includes:
    a second pin housing with which a second coupling pin provided on the side jig is fitted; and
    a second ball clamp which is installed in the second pin housing and clamps the second coupling pin by a plurality of balls.

4. The vehicle body assembly system of claim 3, wherein the second ball clamp includes a pair of second race members which is provided such that the balls roll, and installed to be movable from the outside to the center of the second coupling pin in the circumferential direction by the drive unit.

5. The vehicle body assembly system of claim 4, wherein:
    the second coupling pin has a second ball coupling groove that is formed in the circumferential direction of the second coupling pin and has a rounded shape, and the balls are coupled to the second ball coupling groove by the second race members.

6. The vehicle body assembly system of claim 2, wherein:
a second position sensor, which detects a position of the side assembly and controls the drive unit of the second movable member based on a detection signal, is installed on the indexer frame.

7. The vehicle body assembly system of claim 2, wherein:
a vehicle type tag is mounted on the side jig, and tag readers are mounted at the respective sides of the rotating body.

8. The vehicle body assembly system of claim 1, wherein the guide post includes:
a first movable member which is installed on a pre-buck frame at each of both sides of the conveying route so as to be reciprocally movable in the vehicle width direction by a drive unit;
a pair of post frames which is installed on the first movable member so as to be spaced apart from each other; and
a plurality of hanger coupling units which is installed on the post frame and is pin-coupled to the side hanger.

9. The vehicle body assembly system of claim 8, wherein the hanger coupling unit includes:
a first pin housing with which a first coupling pin provided on the side hanger is fitted; and
a first ball clamp which is installed in the first pin housing and clamps the first coupling pin by a plurality of balls.

10. The vehicle body assembly system of claim 9, wherein:
the first ball clamp includes a pair of first race members which is provided such that the balls roll, and installed to be movable from the outside to the center of the first coupling pin in the circumferential direction by the drive unit.

11. The vehicle body assembly system of claim 10, wherein:
the first coupling pin has a first ball coupling groove that is formed in the circumferential direction of the first coupling pin and has a rounded shape, and the balls are coupled to the first ball coupling groove by the first race members.

12. The vehicle body assembly system of claim 8, wherein:
a plurality of second dampers, which clamps a lowest end portion of the side assembly separately from the side hanger in a state in which the side hanger is coupled to the hanger coupling unit, is installed on the first movable member.

13. The vehicle body assembly system of claim 12, wherein:
the second damper is installed to be reciprocally movable by the drive unit in three-axis directions including the vehicle body conveying direction, the vehicle width direction, and a height direction.

14. The vehicle body assembly system of claim 13, wherein:
a first position sensor, which detects a position of the side assembly and controls the drive unit based on a detection signal, is installed on the second damper.

15. The vehicle body assembly system of claim 1, wherein the side hanger includes:
a hanger frame which is mounted at a tip of an arm of the first handling robot in the pre-buck section;
at least one reference pin which is installed on the hanger frame and fitted with a reference hole of the side assembly;
a plurality of first dampers which is installed on the hanger frame, clamps the lower portion of the side assembly, and restricts a vehicle body conveying direction and a height direction of the side assembly; and
a plurality of first coupling pins which is installed on the hanger frame and coupled to the guide post.

16. The vehicle body assembly system of claim 15, wherein:
the first dampers, which correspond to front, center, and rear pillars of the side assembly among the plurality of first dampers, are installed to be reciprocally movable in the vehicle body conveying direction by a drive unit.

17. The vehicle body assembly system of claim 15, wherein:
a plurality of mounting seats is formed on the hanger frame in order to additionally mount the first dampers.

18. The vehicle body assembly system of claim 13, wherein:
the first coupling pin has a first ball coupling groove that is formed in a circumferential direction of the first coupling pin and has a rounded shape.

19. The vehicle body assembly system of claim 8, wherein:
the first handling robot is separated from the side hanger in a state in which the side hanger is coupled to the hanger coupling unit by the first handling robot.

20. The vehicle body assembly system of claim 19, wherein:
a driving power supply unit for providing driving power to the side hanger is installed on the post frame.

21. The vehicle body assembly system of claim 1, wherein the side jig includes:
a jig frame which is mounted at a tip of an arm of the second handling robot in the main-buck section;
a plurality of third dampers which is installed on the jig frame, clamps the upper portion of the side assembly, and restricts the vehicle width direction of the side assembly; and
a plurality of second coupling pins which is installed on the jig frame and coupled to the rotary indexer.

22. The vehicle body assembly system of claim 21, wherein:
the second coupling pin has a second ball coupling groove that is formed in a circumferential direction of the second coupling pin and has a rounded shape.

23. The vehicle body assembly system of claim 1, further comprising:
a robot hanger which unloads the side assembly conveyed to the pre-buck section by a conveying hanger and loads the side assembly to the side hanger,
wherein the robot hanger includes an alignment jig for aligning the side assembly.

24. The vehicle body assembly system of claim 8, wherein:
the first handling robot is moved by being synchronized with the first movable member in a state in which the side hanger is coupled to the hanger coupling unit by the first handling robot.

* * * * *